US012515370B2

(12) United States Patent

Ogino et al.

(10) Patent No.: US 12,515,370 B2

(45) Date of Patent: Jan. 6, 2026

(54) PORTABLE MACHINING APPARATUS

(71) Applicant: MAKITA CORPORATION, Anjo (JP)

(72) Inventors: Yohei Ogino, Anjo (JP); Koichi Tsuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 339 days.

(21) Appl. No.: 18/078,334

(22) Filed: Dec. 9, 2022

(65) Prior Publication Data

US 2023/0191649 A1 Jun. 22, 2023

(30) Foreign Application Priority Data

Dec. 22, 2021 (JP) ................................ 2021-208717

(51) Int. Cl.
*B27G 19/04* (2006.01)

(52) U.S. Cl.
CPC .................................. *B27G 19/04* (2013.01)

(58) Field of Classification Search
CPC ..................................................... B27G 19/04
USPC ........................................................... 30/391
See application file for complete search history.

(56) References Cited

U.S. PATENT DOCUMENTS 2,367,432 A * 1/1945 Reprogle ................ A61F 15/02 606/176
4,255,995 A 3/1981 Connor
4,589,208 A 5/1986 Iwasaki et al.
8,037,610 B2 10/2011 Chambers
8,522,658 B2 9/2013 Frolov
8,844,415 B2 9/2014 Taylor
2004/0060178 A1 * 4/2004 Willer ...................... B27B 9/00 30/391
2006/0288590 A1 12/2006 Aoyama et al.
2010/0269353 A1 10/2010 Martin
(Continued)

FOREIGN PATENT DOCUMENTS

DE 10 2007 011 168 A1 9/2008
EP 0 466 294 A1 1/1992
(Continued)

OTHER PUBLICATIONS

Sep. 6, 2024 Office Action issued in U.S. Appl. No. 18/078,326.
(Continued)

*Primary Examiner* — Nhat Chieu Q Do
(74) *Attorney, Agent, or Firm* — Oliff PLC

(57) ABSTRACT

A portable machining apparatus includes a main body, a cover including a cover main body and a door, a door open/close mechanism, and a lock to lock the open/close mechanism in a closed state displaceably supported by the cover main body or the main body portion. The main body is displaceable relative to the cover between a first position entirely containing the tip tool in the cover, and a second position partially exposing the tip tool outside the cover. The lock is manually displaceable between a position blocking the door from opening, and a position permitting the door to open. The lock is displaceable when the main body is at the first position, and is not displaceable by abutment between the other of the cover main body and the main body and the lock operation member when the main body is at a position other than the first position.

8 Claims, 32 Drawing Sheets

(56) References Cited

U.S. PATENT DOCUMENTS

| | | | | |
|---|---|---|---|---|
| 2017/0021466 | A1* | 1/2017 | Hiroshima | B27B 9/00 |
| 2018/0056543 | A1 | 3/2018 | Okouchi et al. | |
| 2020/0164449 | A1* | 5/2020 | Lauer | B23D 45/16 |
| 2020/0254576 | A1 | 8/2020 | Kume et al. | |
| 2020/0306849 | A1 | 10/2020 | Hansen et al. | |

FOREIGN PATENT DOCUMENTS

| | | | |
|---|---|---|---|
| JP | 2004-142105 | A | 5/2004 |
| JP | 2007-007883 | A | 1/2007 |
| JP | 2007-030314 | A | 2/2007 |
| JP | 2007-136794 | A | 6/2007 |
| JP | 2011-255502 | A | 12/2011 |
| JP | 2016-055630 | A | 4/2016 |
| JP | 2017-024115 | A | 2/2017 |
| JP | 2017-024116 | A | 2/2017 |
| JP | 2018-176310 | A | 11/2018 |
| JP | 2020-128026 | A | 8/2020 |
| JP | 2020-192782 | A | 12/2020 |

OTHER PUBLICATIONS

U.S. Appl. No. 18/078,326, filed Dec. 9, 2022 in the name of Ogino et al.

Jun. 3, 2025 Office Action issued in Japanese Application No. 2021-208716.

Jun. 3, 2025 Office Action issued in Japanese Application No. 2021-208717.

Jun. 5, 2025 Office Action issued in U.S. Appl. No. 18/078,326.

* cited by examiner

A-A

PORTABLE MACHINING APPARATUS

CROSS-REFERENCE TO RELATED APPLICATIONS

This application claims priority from JP 2021-208717 filed on Dec. 22, 2021. The entire contents of each of these applications are incorporated herein by reference in their entirety.

TECHNICAL FIELD

The present invention relates to a plunge-type portable machining apparatus.

BACKGROUND

Conventionally, there have been known various portable machining apparatuses (for example, a circular saw, a groove cutter, and a router) called a plunge type. For example, the plunge circular saw (hereinafter also simply referred to as the circular saw) includes a generally rectangular base having an abutment surface to be placed in abutment with a cutting target material, and a main body portion. The main body portion includes an electric motor and a cutting blade rotationally driven by the electric motor. The cutting blade is contained in a cover in a state of being biased upward by a biasing member (the position of the cutting blade at this time will also be referred to as a top dead center).

When using such a circular saw, a user places the circular saw at a position where the cutting target material starts to be cut so as to bring the abutment surface of the base into abutment with the cutting target material. Next, the user maximally displaces the cutting blade from the top dead center downward in a state that the cutting blade is rotated (the position of the cutting blade at this time will also be referred to as a bottom dead center). At this time, the lower portion of the cutting blade protrudes to the lower side beyond the base, and the cutting target material starts to be cut. Next, the user moves the circular saw forward to a cutting end position while maintaining the position of the cutting blade at the bottom dead center. Then, the user returns the cutting blade to the top dead center after stopping the rotation of the cutting blade. Such a cutting method will be referred to as plunge cutting.

An openable/closable cover may be employed in such a plunge circular saw to facilitate the replacement of the cutting blade. For example, DE Patent Application Publication No. 102007011168 discloses a plunge circular saw in which a side surface of a cover (a surface generally perpendicular to a rotational axis of a cutting blade) is openable by being hinged with a support point thereof placed at the lowermost portion of the cover.

SUMMARY

The present specification discloses a portable machining apparatus. This portable machining apparatus may include a main body portion including a motor configured to provide a rotational driving force to a tip tool (for example, a cutting blade), a cover configured to at least partially cover the tip tool and including a cover main body and an openable/closable door, an open/close mechanism supported by the cover main body and configured to open and close the door, and a lock operation mechanism displaceably supported by one of the cover main body and the main body portion and configured to lock the open/close mechanism in a closed state. The main body portion may be configured to be displaceable relative to the cover between a first position, at which the tip tool is entirely contained in the cover, and a second position, at which the tip tool is partially exposed to outside the cover. The lock operation mechanism may be configured to be displaceable according to a manual operation between a blocking position, at which the lock operation mechanism blocks the door from being opened by the open/close mechanism, and a permission position, at which the lock operation mechanism permits the door to be opened by the open/close mechanism. The portable machining apparatus may be configured in such a manner that the lock operation mechanism is permitted to be displaced from the blocking position to the permission position when the main body portion is located at the first position, and that the lock operation mechanism is prohibited from being displaced from the blocking position to the permission position by abutment between the other of the cover main body and the main body portion and the lock operation mechanism when the main body portion is located at a position other than the first position.

According to the above-described configuration, when the main body portion is located at a position other than the first position, the lock operation mechanism is prohibited from being displaced from the blocking position to the permission position by the abutment between the other of the cover main body and the main body portion and the lock operation mechanism. Therefore, the portable machining apparatus can be prevented from incurring damage when a user operates the lock operation mechanism to open the door of the cover. More specifically, if the main body portion is movable from a position other than the first position to the first position in the state that the lock operation mechanism is displaced to the permission position, the other of the cover main body and the main body portion and the lock operation mechanism might strongly hit each other and cause damage. However, according to the above-described configuration, such a situation does not occur. Therefore, the user does not have to operate the portable machining apparatus carefully not to inflict damage on the portable machining apparatus due to an erroneous operation when opening the door. Therefore, the user's convenience is improved.

The present specification further discloses a portable machining apparatus. This portable machining apparatus may include a main body portion including a motor configured to provide a rotational driving force to a tip tool (for example, a cutting blade), a cover configured to at least partially cover the tip tool and including a cover main body and an openable/closable door, an open/close mechanism supported by the cover main body and configured to open and close the door, and a lock operation mechanism displaceably supported by one of the cover main body and the main body portion and configured to lock the open/close mechanism in a closed state. The main body portion may be configured to be displaceable relative to the cover between a first position, at which the tip tool is fully contained in the cover, and a second position, at which the tip tool is partially exposed to outside the cover. The lock operation mechanism may be configured to be displaceable according to a manual operation between a blocking position, at which the lock operation mechanism blocks the door from being opened by the open/close mechanism, and a permission position, at which the lock operation mechanism permits the door to be opened by the open/close mechanism. The portable machining apparatus may be configured in such a manner that the lock operation mechanism is permitted to be displaced from the blocking position to the permission position when the main body portion is located at the first position, the lock operation mechanism is prohibited from being displaced from the blocking position to the permission position by abutment between the other of the cover main body and the main body portion and the lock operation mechanism when the main body portion is located at a position other than the first position, the main body portion is permitted to be displaced from the first position toward the second position when the lock operation mechanism is located at the blocking position, and the main body portion is prohibited from being displaced from the first position toward the second position by abutment between the other of the cover main body and the main body portion and the lock operation mechanism when the lock operation mechanism is located at the permission position.

According to the above-described configuration, the lock operation mechanism has a closed state lock function of blocking the door from being opened when the main body portion is located at a position other than the first position, and a main body portion position lock function of prohibiting the main body portion from being displaced from the first position toward the second position when the lock operation mechanism is located at the permission position. Therefore, the size of the portable machining apparatus can be reduced compared to when these two functions are realized by individual different mechanisms, respectively. As a result, the handleability of the portable machining apparatus is improved and the user's convenience is improved.

The present specification further discloses a portable machining apparatus. This portable machining apparatus may include a main body portion including a motor configured to provide a rotational driving force to a tip tool (for example, a cutting blade), a cover configured to at least partially cover the tip tool and including a cover main body and an openable/closable door, an open/close mechanism supported by the cover main body and configured to open and close the door, and a lock operation mechanism displaceably supported by one of the cover main body and the main body portion and configured to lock the open/close mechanism in a closed state. The main body portion may be configured to be displaceable relative to the cover between a first position, at which the tip tool is fully contained in the cover, and a second position, at which the tip tool is partially exposed to outside the cover. The lock operation mechanism may be configured to be displaceable according to a manual operation between a blocking position, at which the lock operation mechanism blocks the door from being opened by the open/close mechanism, and a permission position, at which the lock operation mechanism permits the door to be opened by the open/close mechanism. The main body portion may include a battery count portion configured to allow a battery functionable as a power source of the motor to be attached thereto. The portable machining apparatus may be configured to allow an operation for displacing the lock operation mechanism from the blocking position to the permission position only in a state that the main body portion is located at the first position and the battery is not mounted on the battery mount portion.

According to the above-described configuration, the door is allowed to be opened via the operation on the lock operation mechanism only in the state that the tip tool is fully contained in the cover and the motor cannot be rotated. Therefore, the user does not have to pay attention to an unintentional exposure of the tip tool from the cover and an unintentional rotation of the tip tool when opening the door, and thus the user's convenience is improved.

The present specification further discloses a portable machining apparatus. This portable machining apparatus may include a main body portion including a motor having a motor shaft, an output shaft configured to output a rotational driving force of the motor shaft to a tip tool (for example, a cutting blade), and a battery mount portion configured to allow a battery functionable as a power source of the motor to be attached thereto. The portable machining apparatus may further include a cover configured to at least partially cover the tip tool, an engagement member configured to be displaceable between an engagement position, at which the engagement member blocks the motor shaft and the output shaft from being rotated when the motor is not driven by being engaged with the motor shaft or the output shaft, and a non-engagement position, at which the engagement member permits the motor shaft and the output shaft to be rotated without being engaged with any of the motor shaft and the output shaft, and an operation member configured to be displaced from an initial position to a pressed position by being pressed by the battery when the battery is mounted on the battery mount portion. The main body portion may be configured to be displaceable relative to the cover between a first position, at which the tip tool is fully contained in the cover, and a second position, at which the tip tool is partially exposed to outside the cover. The engagement member and the operation member may be configured to be interlocked with each other in such a manner that the engagement member is located at the engagement position when the operation member is located at the initial position and the engagement member is located at the non-engagement position when the operation member is located at the pressed position.

According to the above-described configuration, once the battery is dismounted, the engagement member and the motor shaft or the output shaft are engaged with each other, and the motor shaft and the output shaft are blocked from being rotated. Therefore, the user can block the output shaft from being rotated when replacing the tip tool only by performing a simple operation of demounting the battery, thereby easily performing the work of replacing the tip tool. Therefore, the user's convenience is improved.

DETAILED DESCRIPTION OF THE EMBODIMENTS

Figure 1:
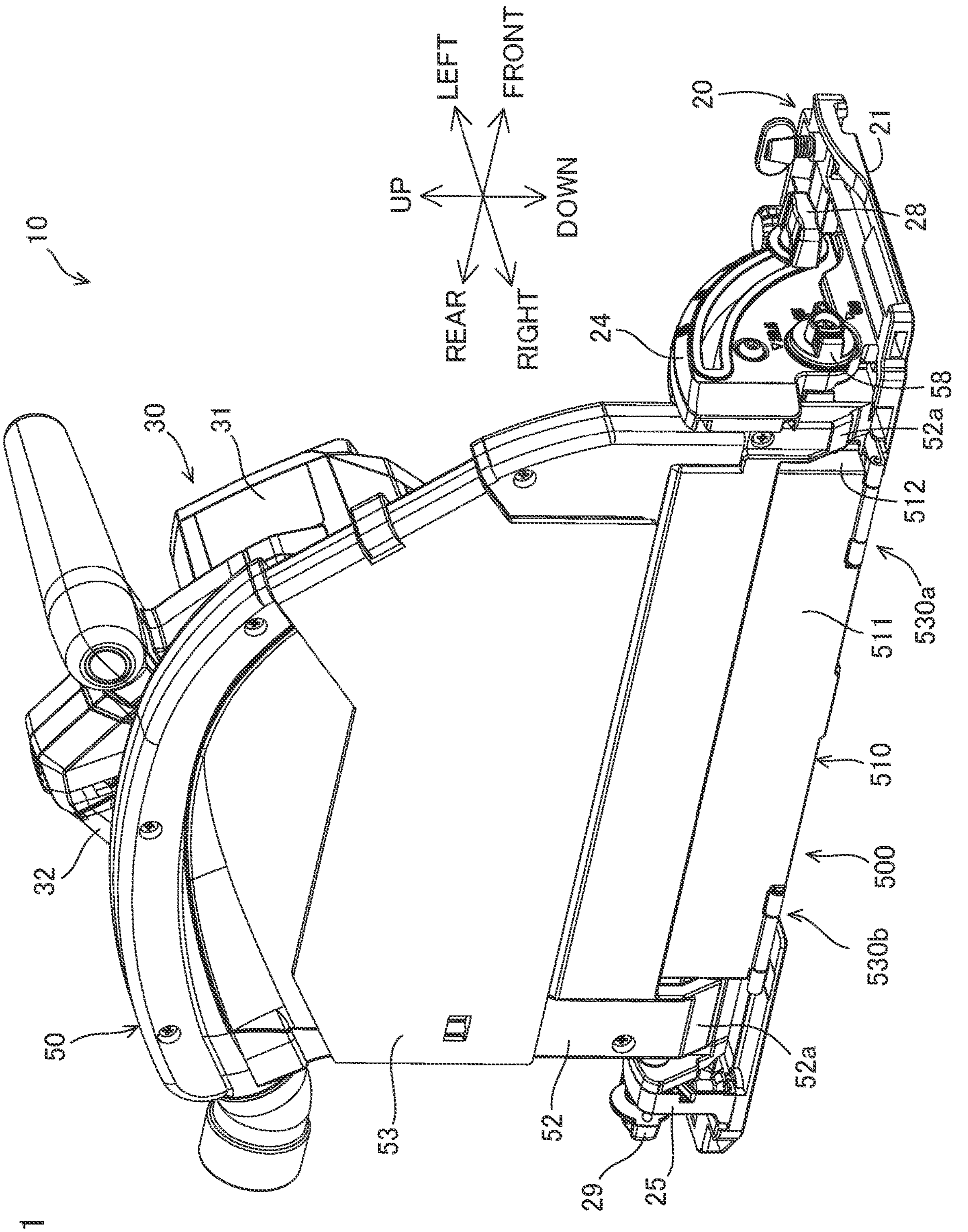
FIG. 1 is a perspective view illustrating one example of a circular saw according to a first embodiment, and a main body portion is located at a top dead center.

Representative and non-limiting specific examples of the present invention will be described in detail below with reference to the drawings. This detailed description is merely intended to teach a person of skill in the art details for practicing preferred examples of the present invention and is not intended to limit the scope of the present invention. Furthermore, each of additional features and inventions disclosed below can be utilized separately from or together with the other features and inventions to provide further improved apparatuses and methods for manufacturing and using the same.

Moreover, combinations of features and steps disclosed in the following detailed description are not necessary to practice the present invention in the broadest sense, and are instead taught merely to particularly describe a representative specific example of the present invention. Furthermore, various features of the above-described and the following representative examples, as well as various features recited in the independent and dependent claims below, do not necessarily have to be combined in herein specifically exemplified manners or enumerated orders to provide additional and useful embodiments of the present invention.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges and indications of groups or aggregations are intended to disclose every possible intermediate individual forming them for the purpose of original written disclosure, as well as for the purpose of restricting the claimed subject matter.

In one or more embodiment(s), the lock operation mechanism may include an abutment portion protruding toward the other of the cover main body and the main body portion and configured to be displaceable between the blocking position and the permission position. The other of the cover main body and the main body portion may include a first abutted portion configured to be in abutment with the abutment portion in a direction for prohibiting the abutment portion from being displaced from the blocking position to the permission position when the main body portion is located at the position other than the first position, and a retracted portion disposed adjacent to the first abutted portion, recessed with respect to the first abutted portion in a direction in which the abutment portion protrudes, and having a belt-like shape. The abutment portion may be located at a position that faces the retracted portion and be out of abutment with the first abutted portion in the direction for prohibiting the abutment portion from being displaced from the blocking position to the permission position when the main body portion is located at the first position. According to this configuration, the door is securely blocked from being opened via the lock operation mechanism by the abutment between the abutment portion and the first abutted portion when the main body portion is located at a position other than the first position, and the door is allowed to be opened due to the abutment portion located at the position facing the retracted portion when the main body portion is located at the first position.

In one or more embodiment(s), the lock operation mechanism may be supported by the cover main body. According to this configuration, both the open/close mechanism and the lock operation mechanism are supported by the cover main body. Therefore, the open/close mechanism and the lock operation mechanism can be efficiently interlocked. In other words, the present configuration can reduce or eliminate the number of components interposed between the open close mechanism and the lock operation mechanism.

In one or more embodiment(s), the cover may include a hinge mechanism for opening and closing the door. When a front side is defined to be one side in which machining is advanced by the tip tool and a rear side is defined to be an opposite side therefrom, the hinge mechanism may be disposed on the front side or the rear side with respect to a rotational axis of the tip tool. The hinge mechanism may be oriented in such a manner that a rotational motion of the door via the hinge mechanism includes a horizontal component when the portable machining apparatus is in use. According to this configuration, the rotational motion of the door via the hinge mechanism includes the horizontal component (i.e., a component in a direction other than the vertical direction), and therefore the door can be prevented from being widely flung open contrary to the user's intention due to the weight of the door itself. Therefore, the convenience at the time of the work of opening/closing the door is improved.

In one or more embodiment(s), the hinge mechanism may be oriented in such a manner that the rotational motion of the door via the hinge mechanism includes a vertical component when the portable machining apparatus is in use and that an opening motion of the door includes a vertically upward component. According to this configuration, the operation of opening the door is accompanied by the rotation against the weight of the door itself, and therefore the door can be further prevented from being widely flung open contrary to the user's intention.

In one or more embodiment(s), the hinge mechanism may be disposed on the front side with respect to the rotational axis of the tip tool. The open/close mechanism and the lock operation mechanism may be disposed on the rear side with respect to the rotational axis of the tip tool. The user is located on the rear side of the portable machining apparatus when using this type of portable machining apparatus. Therefore, according to this configuration, the lock operation mechanism is supposed to be disposed near the user. Therefore, the user can easily operate the lock operation mechanism. Further, because the distance between the open/close mechanism and the lock operation mechanism is reduced, the open/close mechanism and the lock operation mechanism can be interlocked with a compact configuration. Further, because the distance between the open/close mechanism and the hinge mechanism is increased, a further reliable opening/closing motion of the door can be realized.

In one or more embodiment(s), the main body portion may be configured to be pivotal about a pivotal axis relative to the cover between the first position and the second position. The abutment portion and the first abutted portion may be disposed at positions closer to the pivotal axis than to the rotational axis of the tip tool. According to this configuration, the distances between the abutment portion and the first abutted portion, and the pivotal axis are reduced, and this can lead to a reduction in a circumferential range where the first abutted portion should be disposed to allow the first abutted portion to function properly throughout the entire angular range of the pivotal motion of the main body portion. In other words, the size of the first abutted portion can be reduced.

In one or more embodiment(s), the first abutted portion may be formed in a circular arc shape. The other of the cover main body and the main body portion may include a recessed portion recessed with respect to the first abutted portion and formed along the first abutted portion adjacent to the first abutted portion. The main body portion and the abutment portion may be moved relative to each other while the abutment portion faces the recessed portion when the main body portion is displaced between the first position and the second position in a state that the abutment portion is located at the blocking position. According to this configuration, the recessed portion can ensure that interference between the other of the cover main body and the main body portion and the abutment portion is avoided in the state that the abutment portion (i.e., the lock operation mechanism) is located at the blocking position. Therefore, the main body portion can be moved pivotally between the first position and the second position.

In one or more embodiment(s), the other of the cover main body and the main body portion may include a second abutted portion formed in a belt-like shape along the retracted portion and configured to be in abutment with the abutment portion in a direction for prohibiting the main body portion from being displaced from the first position toward the second position when the abutment portion is located at the permission position. According to this configuration, the lock operation mechanism has a closed state lock function of blocking the door from being opened when the main body portion is located at a position other than the first position, and a main body portion position lock function of prohibiting the main body portion from being displaced from the first position toward the second position when the lock operation mechanism is located at the permission position. Therefore, the size of the portable machining apparatus can be reduced compared to when these two functions are realized by individual different mechanisms, respectively. As a result, the handleability of the portable machining apparatus is improved and the user's convenience is improved.

In one or more embodiment(s), the open/close mechanism may include an engagement portion configured to be displaceable between a close position, at which the open/close mechanism holds the door in a closed state by being engaged with the door, and an open position, at which the open/close mechanism keeps the door in an openable state without being engaged with the door. The engagement portion may be operably coupled with the lock operation mechanism in such a manner that the engagement portion is located at the close position when the lock operation mechanism is located at the blocking position and that the engagement portion is located at the open position when the lock operation mechanism is located at the permission position. According to this configuration, the open/close mechanism and the lock operation mechanism can be appropriately interlocked with a simple configuration.

In one or more embodiment(s), the open/close mechanism may include a biasing member, and a lock member biased by the biasing member in a direction for opening the door and disposed displaceably in directions for opening and closing the door. The lock member may be configured to be located at a position at which the lock member does not interfere with the displacement of the engagement portion from the close position to the open position by being pressed by the door against the biasing force when the door is closed, and be located at a position at which the lock member interferes with the displacement of the engagement portion from the open position to the close position by being pressed by the biasing force of the biasing member when the door is opened. According to this configuration, in a state that the door is opened, the engagement portion is blocked from being displaced from the open position to the close position (i.e., the lock operation member is blocked from being displaced from the permission position to the blocking position) unless the lock member is manually pressed to be displaced to the position at which the lock member does not interfere with the displacement of the engagement portion from the close position to the open position. In other words, in the state that the door is opened, the user cannot return the lock operation member from the permission position to the blocking position to use the portable machining apparatus. Therefore, the user does not have to be careful not to rotate the tip tool contrary to the user's intention when the door is opened. As a result, the user's convenience is improved.

In one or more embodiment(s), the main body portion may include a battery mount portion configured to allow a battery functionable as a power source of the motor to be slidably attached thereto. The lock operation mechanism may be configured to be displaced so as to be located at a position at which the lock operation mechanism interferes with a slide trajectory of the battery for attaching the battery to the battery mount portion when the lock operation mechanism is located at the permission position, and be located at a position at which the lock operation mechanism does not interfere with the slide trajectory when the lock operation mechanism is located at the blocking position. According to this configuration, the battery cannot be mounted on the battery mount portion (thus the tip tool cannot be rotated) when the lock operation mechanism is located at the permission position. Therefore, the user does not have to be careful not to rotate the tip tool contrary to the user's intention when the door is opened.

In one or more embodiment(s), the lock operation mechanism may be in the form of a pivotal operation lever. According to this configuration, stable operability can be acquired, and the user's convenience is improved.

In one or more embodiment(s), the lock operation mechanism may include an operation lever pivotal about a first pivotal axis, and a lock lever pivotal about a second pivotal axis different from the first pivotal axis by being at least temporarily pressed by the operation lever according to the pivotal motion of the operation lever and being at least temporarily engaged with the operation lever, and configured to be in abutment with the other of the cover main body and the main body portion to prohibit, the lock operation mechanism from being displaced from the blocking position to the permission position when the main body portion is located at a position other than the first position. According to this configuration, the design flexibility of the lock operation mechanism is increased and the operability can be improved.

In one or more embodiment(s), the main body portion may include a battery mount portion configured to allow a battery functionable as a power source of the motor to be slidably attached thereto. The portable machining apparatus may be configured to allow an operation for displacing the lock operation mechanism from the blocking position to the permission position only in a state that the main body portion is located at the first position and the battery is not mounted on the battery mount portion. According to this configuration, the user cannot perform an operation for opening the door unless the portable machining apparatus is in the state that the tip tool is fully contained in the cover and the battery is not mounted on the battery mount portion. Therefore, the user does not have to pay attention to an unintentional exposure of the tip tool from the cover and an unintentional rotation of the tip tool when opening the door.

In the following description, the embodiments of the present invention will be described in further detail with reference to the drawings.

A first embodiment of the present invention will be described now. In the present embodiment, a plunge circular saw 10 (hereinafter simply referred to as a circular saw 10) will be exemplarily cited as one example of a portable machining apparatus or a portable cutting apparatus. In the following description, a front side of a circular saw 10 will be defined to be one side to which the circular saw 10 is advanced (in a direction in which the cutting proceeds) when a user cuts a cutting target material with the circular saw 10 held in his/her hand, and a rear side of the circular saw 10 will be defined to be an opposite side therefrom, for convenience of the description. Further, an upper side and a lower side of the circular saw 10 will be defined to be one side located on an upper side in the vertical direction at this time and an opposite side therefrom, respectively. Further, a left-right direction of the circular saw 10 will be defined to be a direction perpendicular to the front-rear direction and the vertical direction. A right side and a left side of the circular saw 10 will be defined to be a right side and an opposite side therefrom in the left-right direction when the front side is viewed from the rear side, respectively.

First, the schematic configuration of the circular saw 10 will be described mainly with reference to FIGS. 1 to 5. As illustrated in FIGS. 1 to 5, the circular saw 10 includes a base 20 to be placed in abutment with the upper surface of a cutting target material, a main body portion 30, and a cover 50. The base 20 has a generally rectangular outer shape. The longitudinal direction of the base 20 extends in the front-rear direction. The base 20 includes a lower surface 21 to be placed in abutment with the upper surface of the cutting target material when this cutting target material is cut. However, the base 20 is not necessarily arranged in such a manner that the lower surface 21 is placed in abutment with the upper surface of the cutting target material. When a long ruler is used together with the circular saw 10 to linearly cut the cutting target material, the base 20 may be arranged in such a manner that the lower surface 21 is placed in abutment with the upper surface of the long ruler.

The main body portion 30 is basically disposed on the upper side with respect to the base 20. The main body portion 30 includes a motor housing 31 that contains an electric motor 33 (refer to FIG. 21) and a grip portion 32 to be held by a user with his/her hand. The electric motor 33 includes a motor shaft 34. The electric motor 33 (the motor shaft 34 thereof) provides a rotational driving force to a saw blade 35 (refer to FIGS. 2 and 4), which is a non-limiting example of a tip tool, via a reduction gear 43 (refer to FIG. 21) contained in a gear housing 60 (refer to FIG. 3) and an output shaft 42 (refer to FIG. 21). A circular saw blade called a tipped saw blade is used as the saw blade 35. In the present embodiment, the gear housing 60 is formed integrally with the motor housing 31.

The cover 50 is disposed on the upper side with respect to the base 20 and at the right-side edge portion of the base 20. The cover 50 is fixed to the base 20 via an angular 26 and angular plates 24 and 25 (the details thereof will be described below). The saw blade 35 has a disk-like shape, and is at least partially contained inside the cover 50. More specifically, a circular arc-shaped through-hole 37 (refer to FIG. 3) is formed on the left side surface of the cover 50. The through-hole 37 extends through this left side surface in the left-right direction. The output shaft 42 is inserted through this through-hole 37 to extend to inside the cover 50. The saw blade 35 is mounted on the distal end of the output shaft 42 using a flange 36 (refer to FIG. 8) inside the cover 50. Due to this configuration, the saw blade 35 is rotated integrally with the output shaft 42 about a rotational axis AX1 (refer to FIG. 8) when the electric motor 33 is driven by receiving power supply from a battery 45 (refer to FIGS. 3 and 4) serving as a power source mounted on a battery mount portion 46 (refer to FIG. 16). A trigger 38 (refer to FIG. 4) is provided at the front end of the grip portion 32. The trigger 38 is used to perform an operation of starting up and stopping the electric motor 33.

Figure 16:
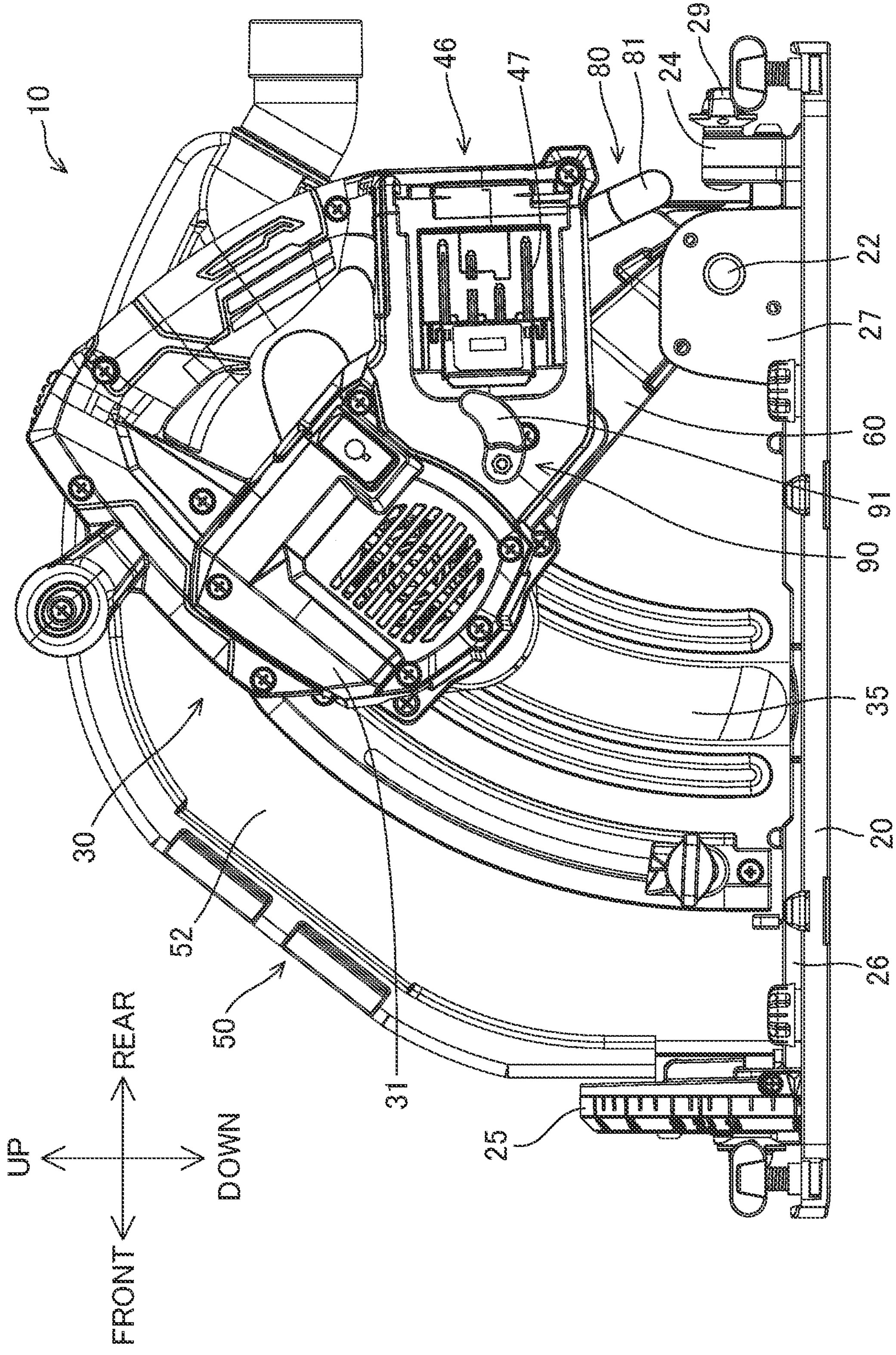
FIG. 16 is a left side view of the circular saw illustrating a state in which a battery is not mounted.

As illustrated in FIG. 16, the battery mount portion 46 is disposed at a rear and lower portion of the main body portion 30. The battery 45 is slidably attachable to the battery mount portion 46. More specifically, the battery mount portion 46 includes a plurality of terminals 47 extending in a rail-like manner. The plurality of terminals 47 and a plurality of terminals (not illustrated) of the battery 45 are electrically connected by sliding the battery 45 in the direction in which the plurality of terminals 47 extends to attach the battery 45 to the battery mount portion 46.

Figure 2:
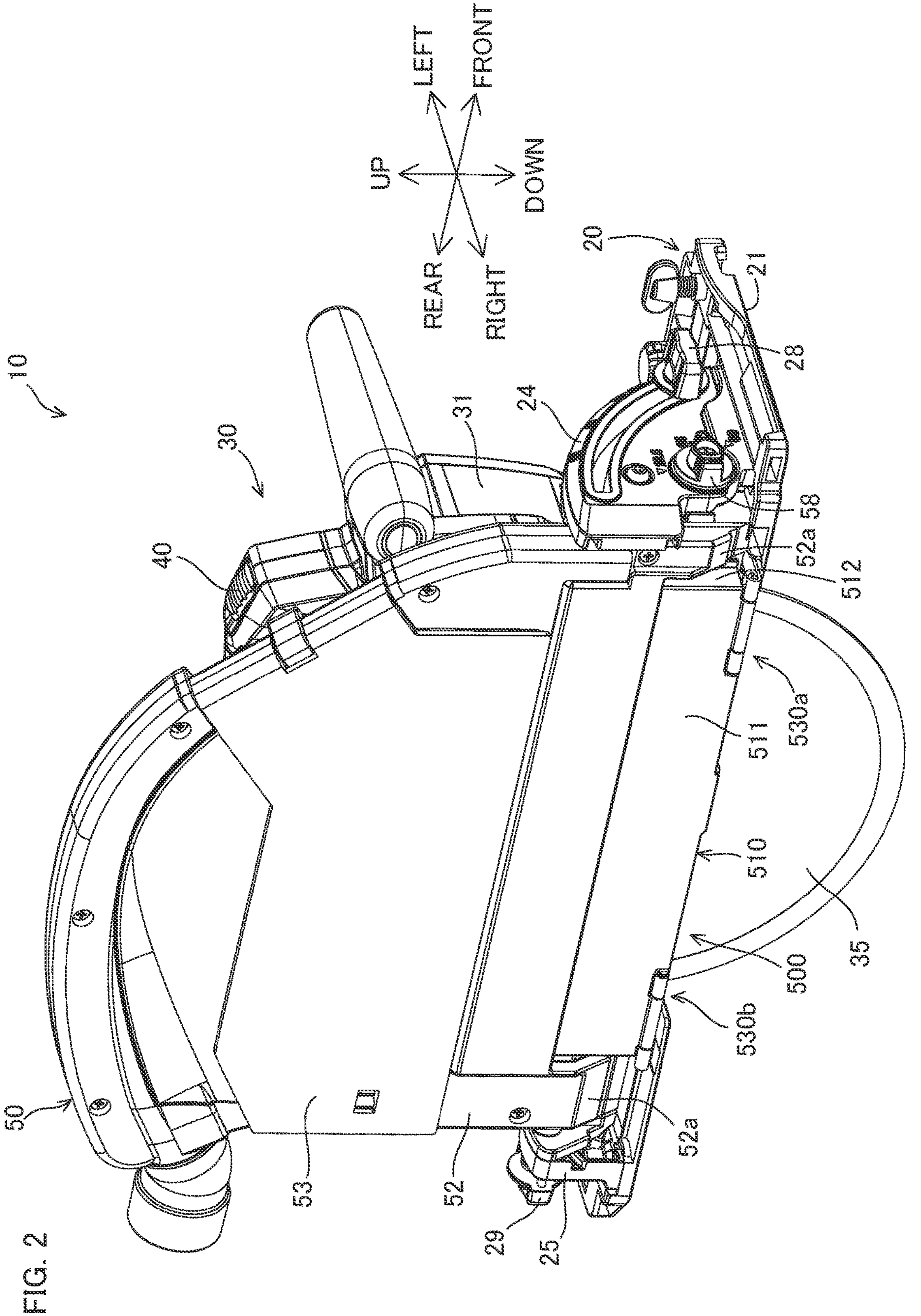
FIG. 2 is a perspective view of the circular saw, and the main body portion is located at a bottom dead center.
Figure 3:
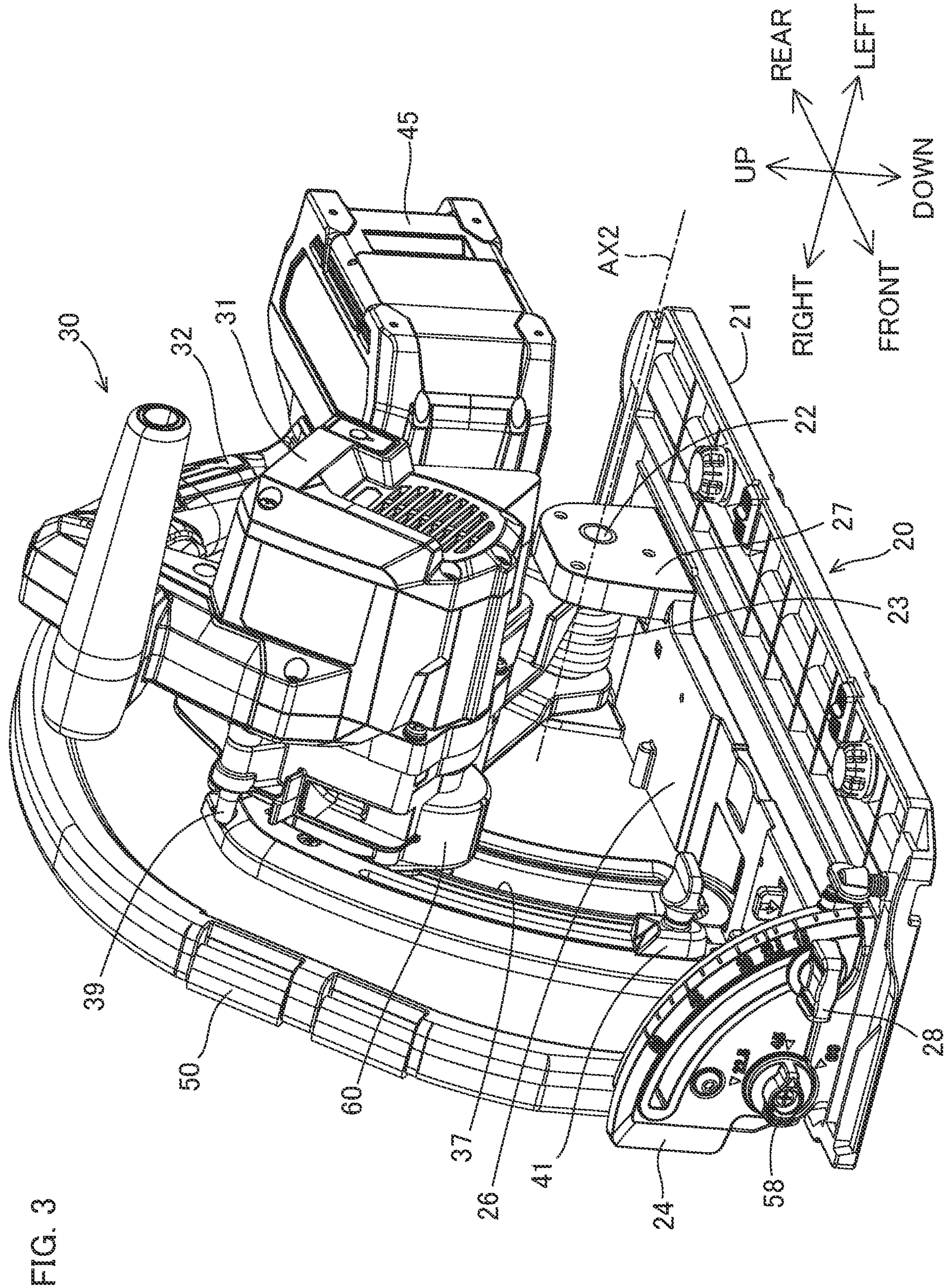
FIG. 3 is a perspective view of the circular saw, and the main body portion is located at the top dead center.
Figure 4:
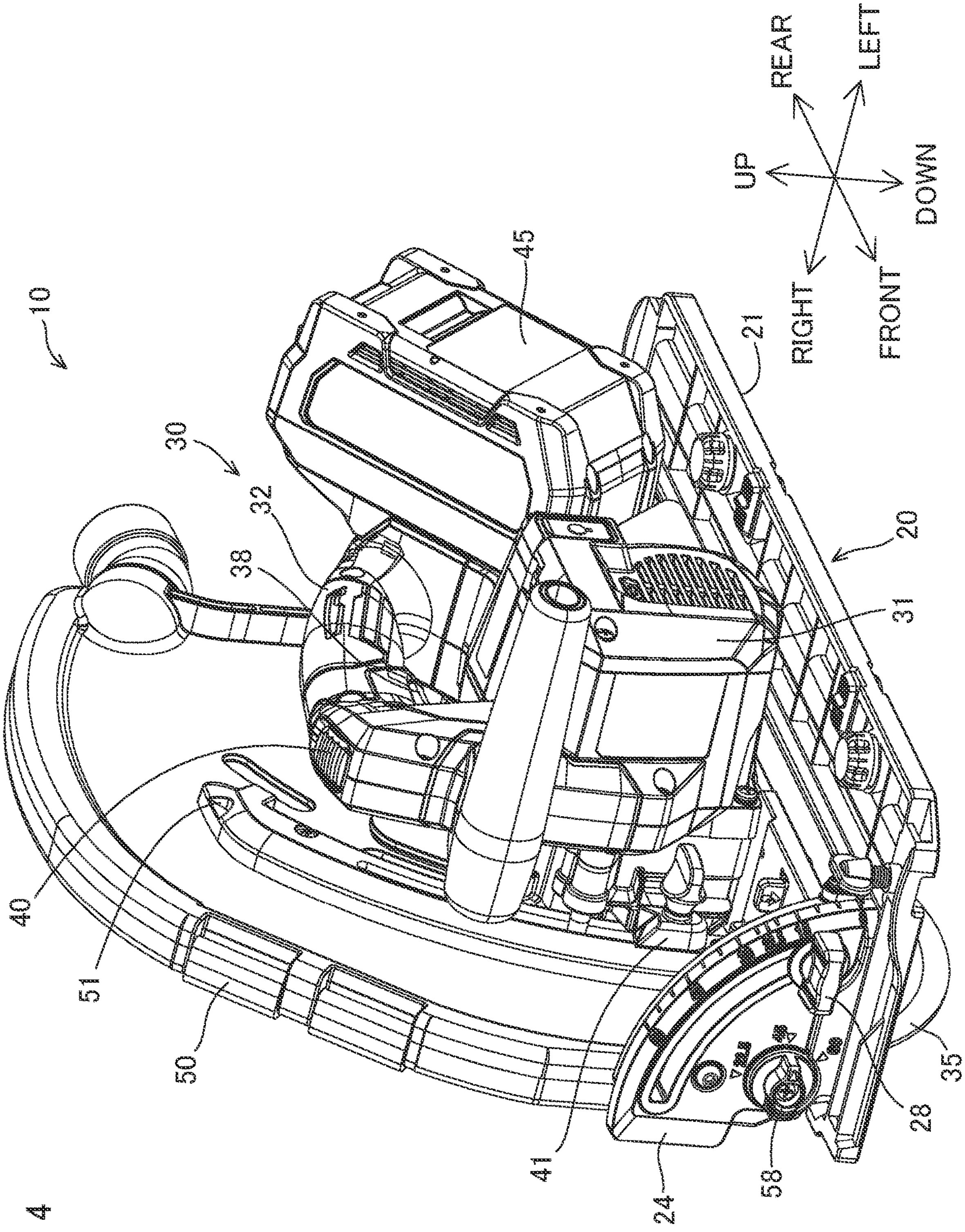
FIG. 4 is a perspective view of the circular saw and the main body portion is located at the bottom dead center.

The main body portion 30 provided in this manner is configured to be pivotal relative to the base 20 and the cover 50 about a support shaft 22 (refer to FIG. 3) supported by the base 20 (a trunnion 27 formed by integral molding on the angular 26 supported on the base 20). The support shaft 22 (i.e., a pivotal axis AX2 of the main body portion 30) is in parallel with the rotational axis AX1. More specifically, the main body portion 30 is displaceable between a position at which the saw blade 35 is entirely located on the upper side with respect to the lower surface 21 of the base 20 and the saw blade 35 is entirely contained in the cover 50 as illustrated in FIGS. 1 and 3 (also referred to as a top dead center), and a position at which the saw blade 35 protrudes to the lower side beyond the lower surface 21 of the base 20 and the saw blade 35 is partially exposed to outside the cover 50 as illustrated in FIGS. 2 and 4 (also referred to as a bottom dead center when the saw blade 35 is in a state of maximally protruding from the lower surface 21). The saw blade 35 “entirely” contained in the cover 50 means that the entire saw blade 35 is not located outside the outline of the cover 50 when being viewed in the direction in which the rotational axis AX1 extends.

A torsion spring 23 is disposed around the support shaft 22. The torsion spring 23 constantly biases the main body portion 30 from the bottom dead center side toward the top dead center side. Therefore, the top dead center corresponds to an initial position of the main body portion 30.

The position of the top dead center is defined by a lock pin 39 (refer to FIG. 3) extending from the gear housing 60 toward the cover 50 and a recessed portion 51 (refer to FIG. 4) formed on the left side surface of the cover 50 (more specifically, a cover main body 52, which will be described below). More specifically, the lock pin 39 is constantly biased by a biasing member (not illustrated) rightward (i.e., toward the cover 50), and the distal end of the lock pin 39 is fitted in the recessed portion 51 when the lock pin 39 is located at a position that faces the recessed portion 51. Due to that, the cover 50 is locked at the top dead center. When a user operates a release button 40 (refer to FIG. 4), the lock pin 39 is retracted leftward against the biasing force of the biasing member. As a result, the engaged state between the lock pin 39 and the recessed portion 51 is released. When the user presses down the main body portion 30 toward the lower side in this state, the main body portion 30 is displaced toward the bottom dead center against the biasing force of the torsion spring 23.

The position of a lower movement end (a movable limit position on the lower side) of the main body portion 30 is defined by a stopper 41 (refer to FIGS. 3 and 4). The user can press down the main body portion 30 until the gear housing 60 abuts against the stopper 41. The stopper 41 is configured in such a manner that the vertical position thereof can be changed. Therefore, the user can change the position of the stopper 41 (i.e., the position of the lower movement end) according to a desired cutting depth. The above-described bottom dead center is the position of the main body portion 30 when the main body portion 30 is lowered to the lower movement end in a state that the stopper 41 is placed at the lowermost point thereof. In the following description, the “lower movement end” will also be referred to as the “bottom dead center” assuming that the stopper 41 is placed at the lowermost point thereof. When the user releases his/her force of pressing down the main body portion 30 toward the lower side in the state that the main body portion 30 is located at the lower movement end, the main body portion 30 is returned to the top dead center under the biasing force of the torsion spring 23.

Further, the main body portion 30 and the cover 50 are configured to be tiltable with respect to the base 20. More specifically, the angular plates 24 and 25 are mounted on the base 20. The angular plates 24 and 25 are each shaped like an approximately quarter circular arc centered on a first tilt axis AX 6 (refer to FIG. 22). The angular plate 24 is fixed to the front-side edge portion of the base 20, and the angular plate 25 is fixed to the rear-side edge portion of the base 20. The front portion and the rear portion of the angular 26 have circular arc shapes generally identical to the angular plates 24 and 25, respectively, and are disposed so as to overlap the angular plates 24 and 25, respectively. The portion of the angular 26 between the front portion and the rear portion is shaped like a generally flat plate extending in the front-rear direction and the left-right direction in such a manner that the longitudinal direction thereof extends in the front-rear direction (refer to FIG. 3). As widely known, loosening finger screws 28 and 29 attached to the angular plates 24 and 25 releases the fixed relationships between the angular 26 fixed to the cover 50 and the angular plates 24 and 25, thereby allowing the main body portion 30 and the cover 50 to be tilted with respect to the base 20. Then, tightening the finger screws 28 and 29 at a desired tilt position establishes the fixed relationships between the angular 26 fixed to the cover 50 and the angular plates 24 and 25, thereby fixing the tilt positions of the main body portion 30 and the cover 50 with respect to the base 20. An angle switching knob 58 is provided on the front surface of the angular plate 24. A limit angle when the main body portion 30 and the cover 50 are tilted can be switched to 22.5 degrees, 45 degrees, or 60 degrees by rotating the angle switching knob 58. Even in the state that the main body portion 30 and the cover 50 are tilted with respect to the base 20, the main body portion 30 can be displaced between the top dead center and the bottom dead center in a similar manner to the above-described method.

Figure 8:
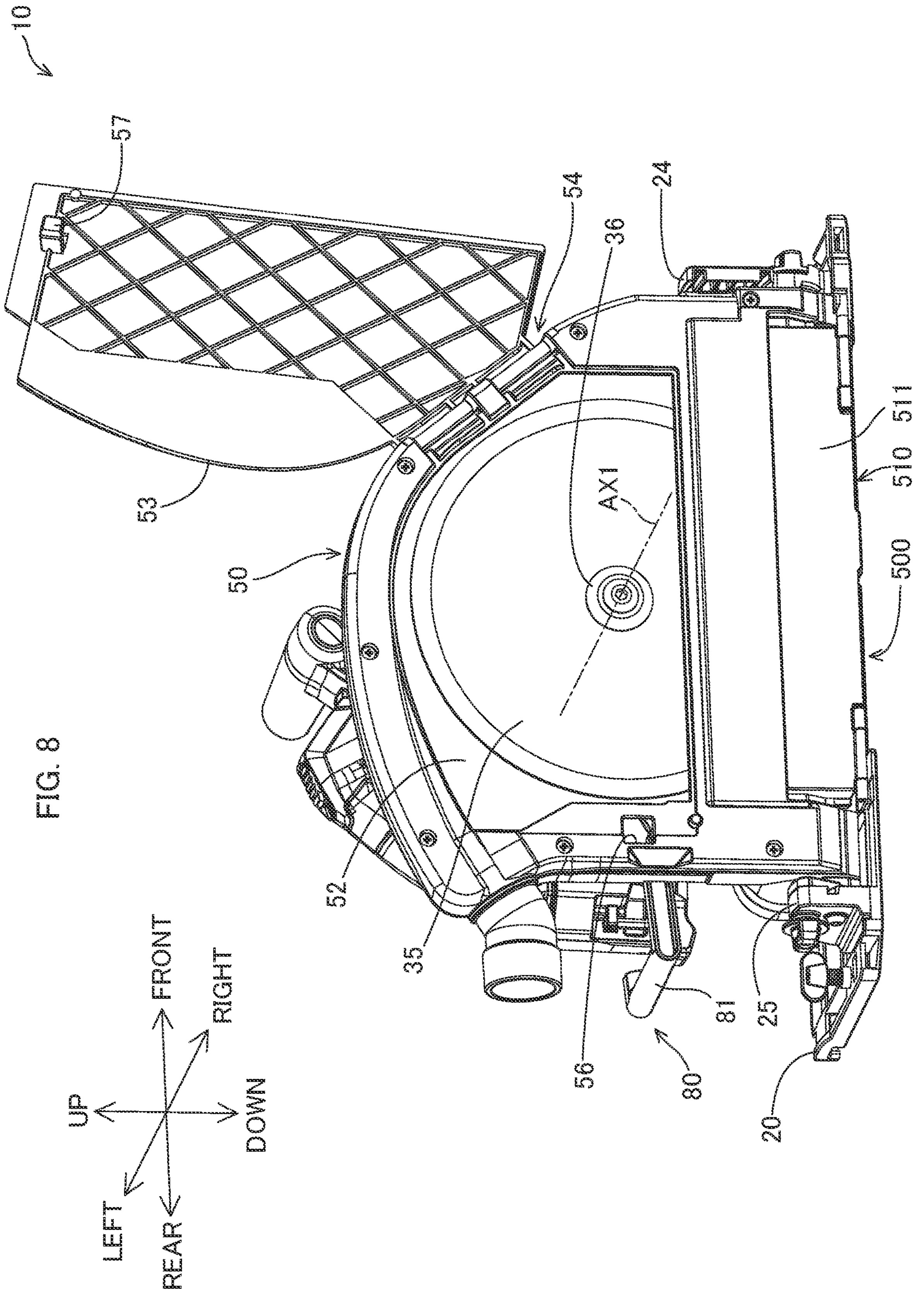
FIG. 8 is a perspective view of the circular saw in a state that a door is opened.

Next, a configuration for replacing the saw blade 35 of the circular saw 10 will be described. As illustrated in FIGS. 1 and 8, the cover 50 includes the cover main body 52 and an openable/closable door 53. The door 53 functions as a part of the right side surface of the cover 50. The door 53 is sized so as to cover the entire upper-side portion and approximately half of the lower-side portion of the saw blade 35 when the main body portion 30 is located at the top dead center. Therefore, when the door 53 is opened, the flange 36 for fixing the saw blade 35 to the output shaft 42 by sandwiching the saw blade 35 in the left-right direction is fully exposed as illustrated in FIG. 8. Therefore, the saw blade 35 can be easily replaced by loosening the flange 36 using a box wrench or the like.

As illustrated in FIG. 8, the door 53 is openable and closable with the aid of a hinge mechanism 54 formed by a part of the cover main body 52 and a part of the door 53. In the present embodiment, the hinge mechanism 54 is disposed on the front side with respect to the rotational axis AX1 of the saw blade 35. Further, the hinge mechanism 54 is oriented in such a direction that the pivotal axis of the door 53 intersects with the horizontal direction (a direction perpendicular to the vertical direction) and the vertical direction. Therefore, the rotational motion of the door 53 includes a horizontal component. Due to the inclusion of the horizontal component in the rotational motion of the door 53, the door 53 can be prevented from being widely flung open contrary to the user's intention due to the weight of the door 53 itself. Further, the hinge mechanism 54 is oriented in such a manner that the rotational motion of the door 53 includes a vertical component and the opening motion of the door 53 also includes an upward component. This means that the user's operation of opening the door 53 is accompanied by a rotation against the weight of the door 53 itself. Therefore, the door 53 can be further prevented from being widely flung open contrary to the user's intention. Such an advantageous effect can also be acquired even when the hinge mechanism 54 is disposed on the rear side with respect to the rotational axis AX1.

Figure 6:
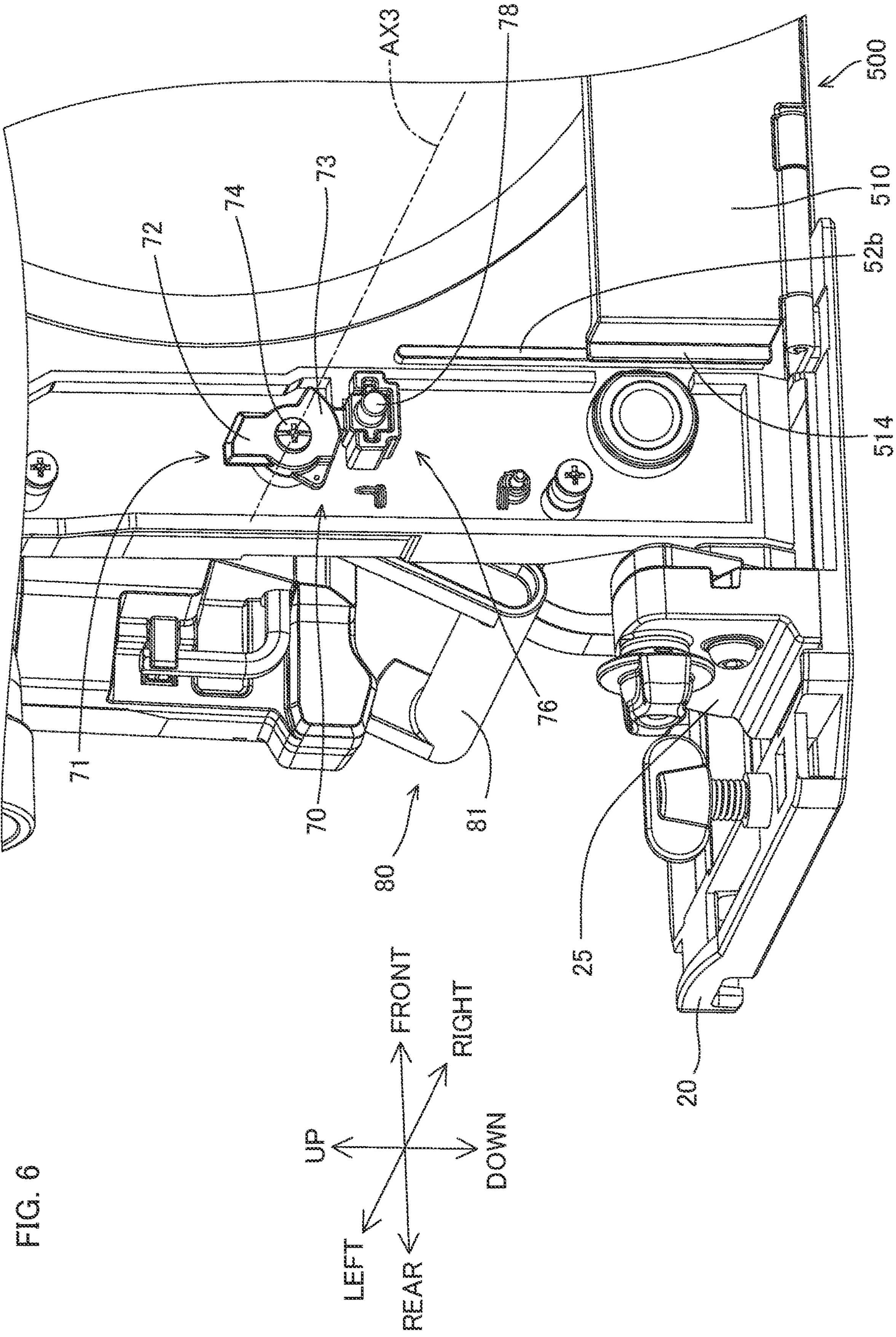
FIG. 6 is a partial enlarged perspective view of the circular saw in a state that a cover is partially removed therefrom, and a lock operation member is located at a blocking position.
Figure 7:
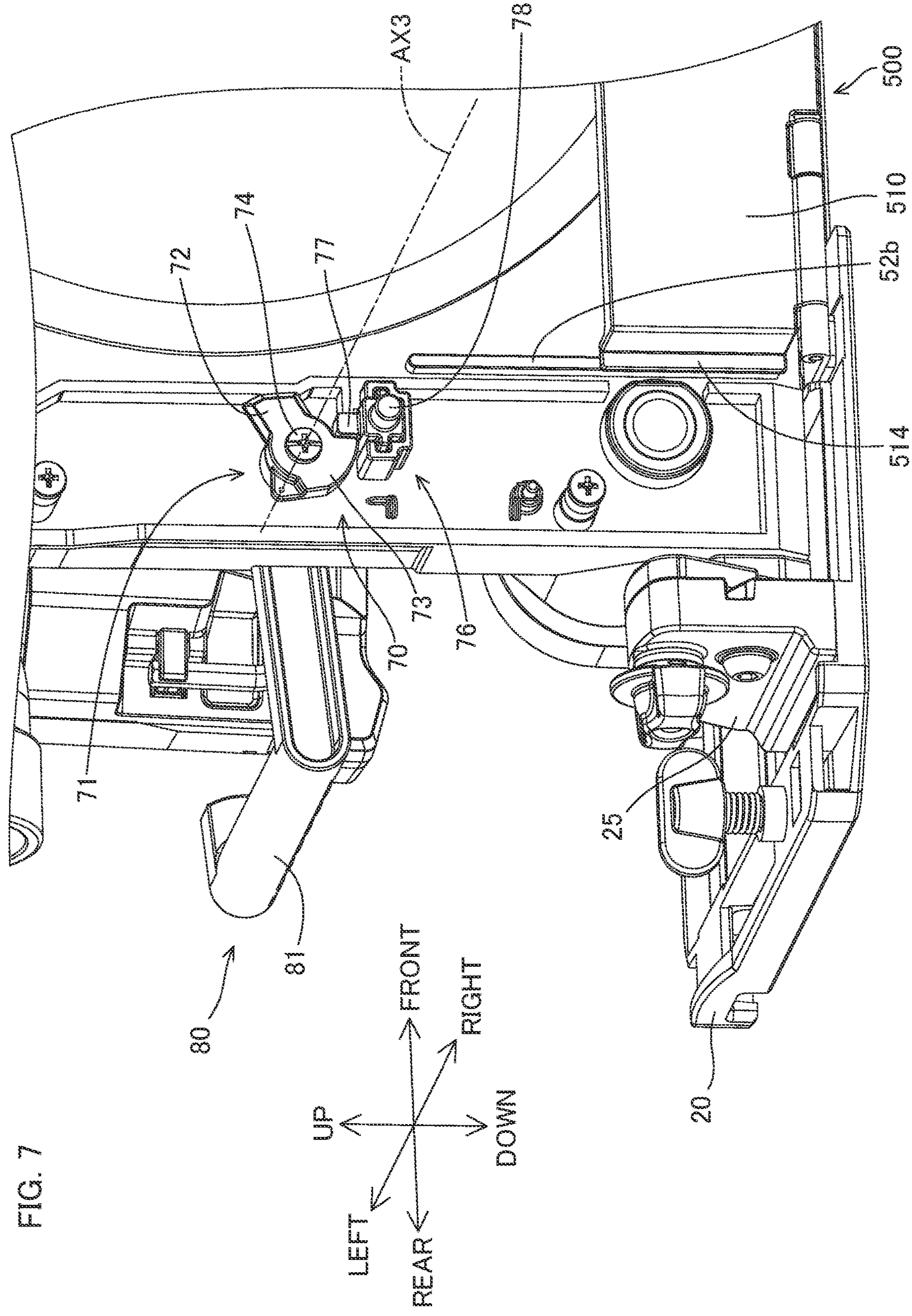
FIG. 7 is a partial enlarged perspective view of the circular saw in the state that the cover is partially removed therefrom, and the lock operation member is located at a permission position.

Further, the circular saw 10 includes an open/close mechanism 70 for opening and closing the door 53, and a lock operation mechanism 80 (an actuator) capable of locking the open/close mechanism 70 in a close state (i.e., a state in which the door 53 is closed). Now, the open/close mechanism 70 and the lock operation mechanism 80 will be described. As illustrated in FIGS. 6 and 7, the open/close mechanism 70 includes an engagement portion 71 for holding the door 53 in the closed state. The engagement portion 71 is pivotally supported by the left-side portion of the cover main body 52. The engagement portion 71 is displaceable between a close position, at which the engagement portion 71 holds the door 53 in the closed state by being engaged with the door 53 (refer to FIG. 6), and an open position, at which the engagement portion 71 brings the door 53 into an openable state without being engaged with the door 53 (refer to FIG. 7).

Figure 14:
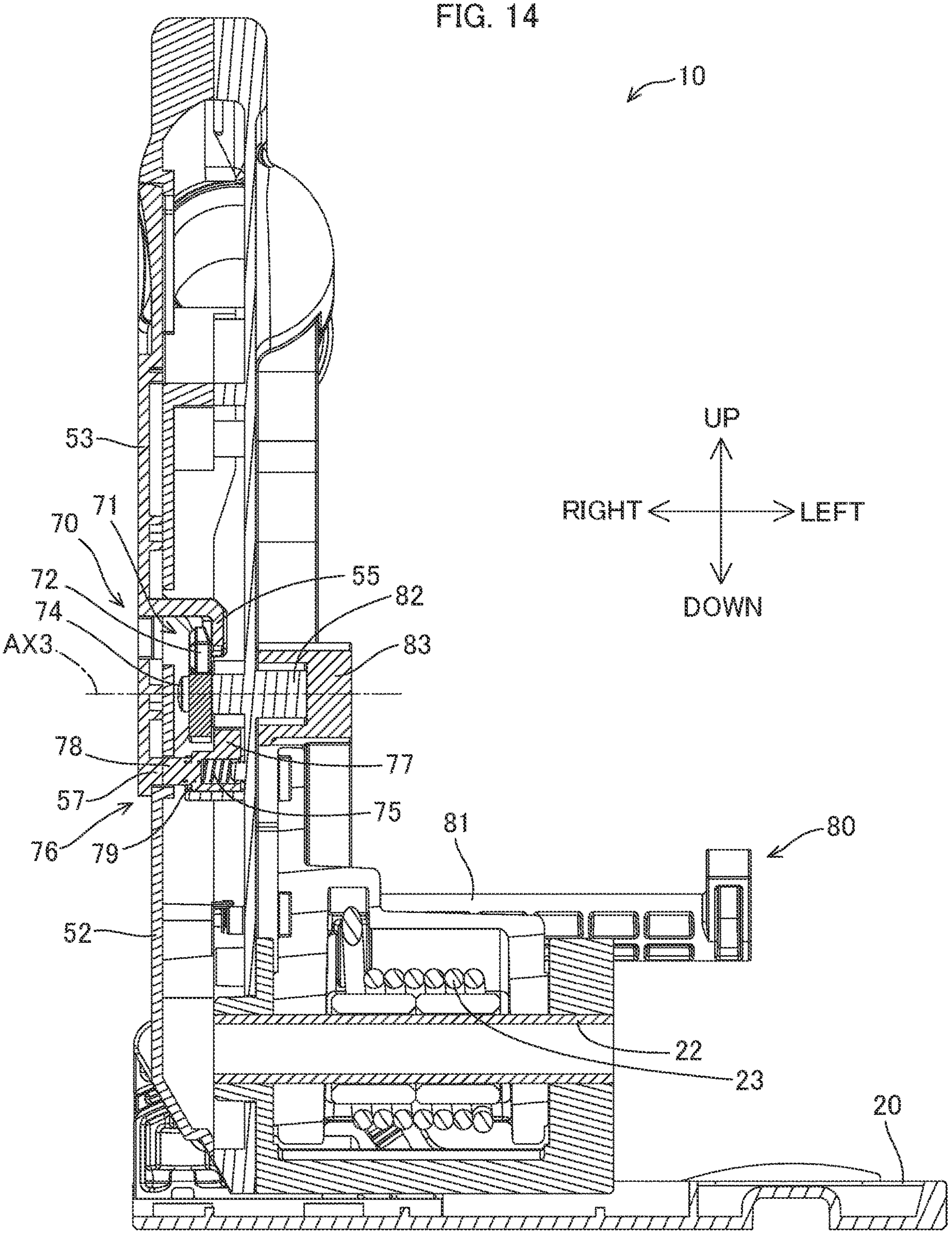
FIG. 14 is a vertical cross-sectional view of the circular saw, and the lock operation mechanism is located at the blocking position.
Figure 15:
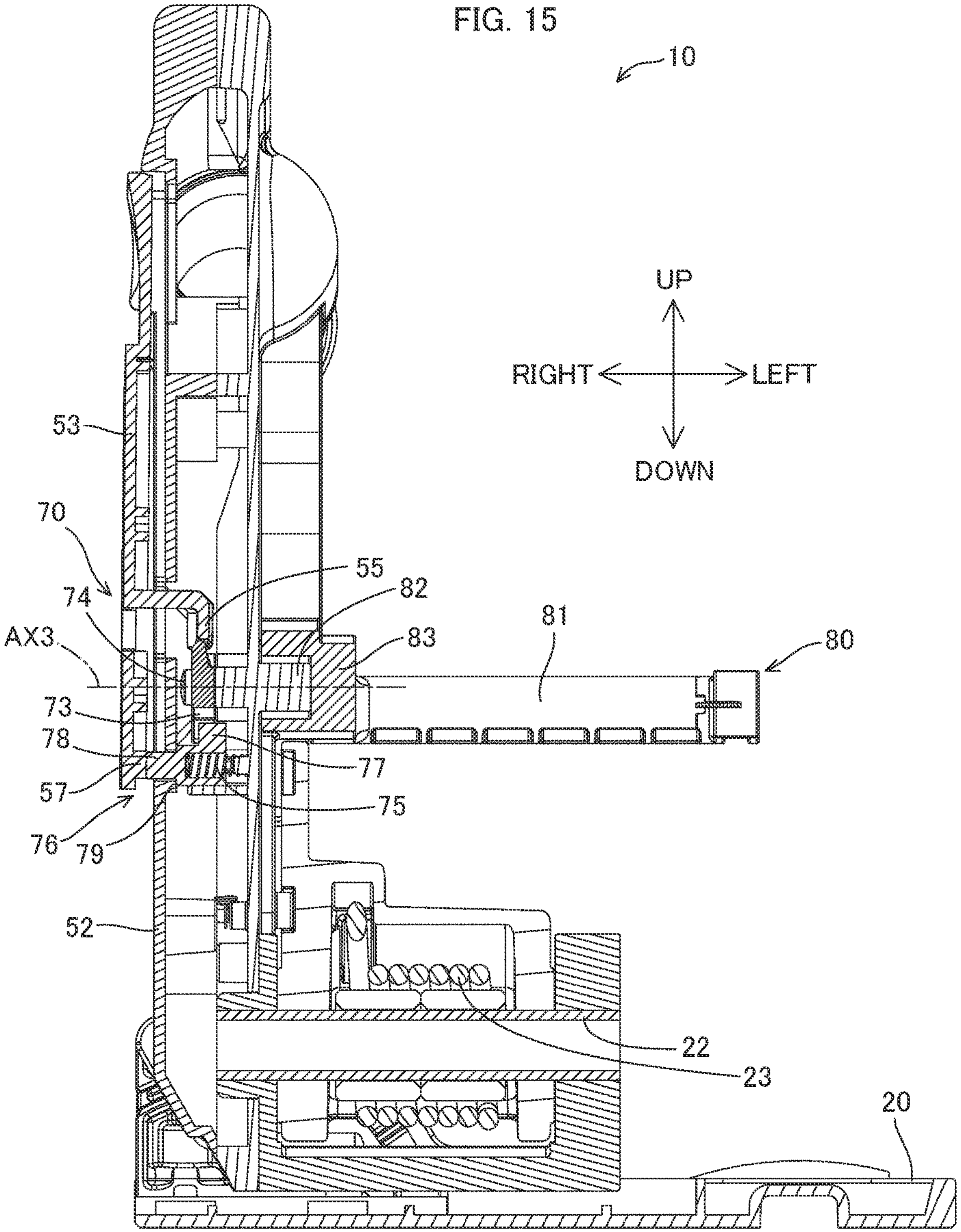
FIG. 15 is a vertical cross-sectional view of the circular saw, and the lock operation mechanism is located at the permission position.

The engagement portion 71 includes a first engagement piece 72 and a second engagement piece 73 extending outward in a radial direction with respect to a pivotal axis AX3 thereof. As illustrated in FIGS. 14 and 15, the door 53 includes an engagement portion 55 protruding from the inner surface (the left surface) thereof leftward (toward the side in which the saw blade 35 is located) in an L-like shape. When the engagement portion 71 is located at the close position (refer to FIG. 6), the first engagement piece 72 of the engagement portion 71 and the distal end (a vertically extending portion) of the engagement portion 55 of the door 53 are engaged with each other in the left-right direction as illustrated in FIG. 14. Therefore, the door 53 cannot be moved in an open direction (rightward), thereby being held in the closed state. On the other hand, when the engagement portion 71 is located at the open position (refer to FIG. 7), the first engagement piece 72 of the engagement portion 71 and the engagement portion 55 of the door 53 are not engaged with each other in the left-right direction as illustrated in FIG. 15. Therefore, the door 53 is allowed to be opened.

Figure 9:
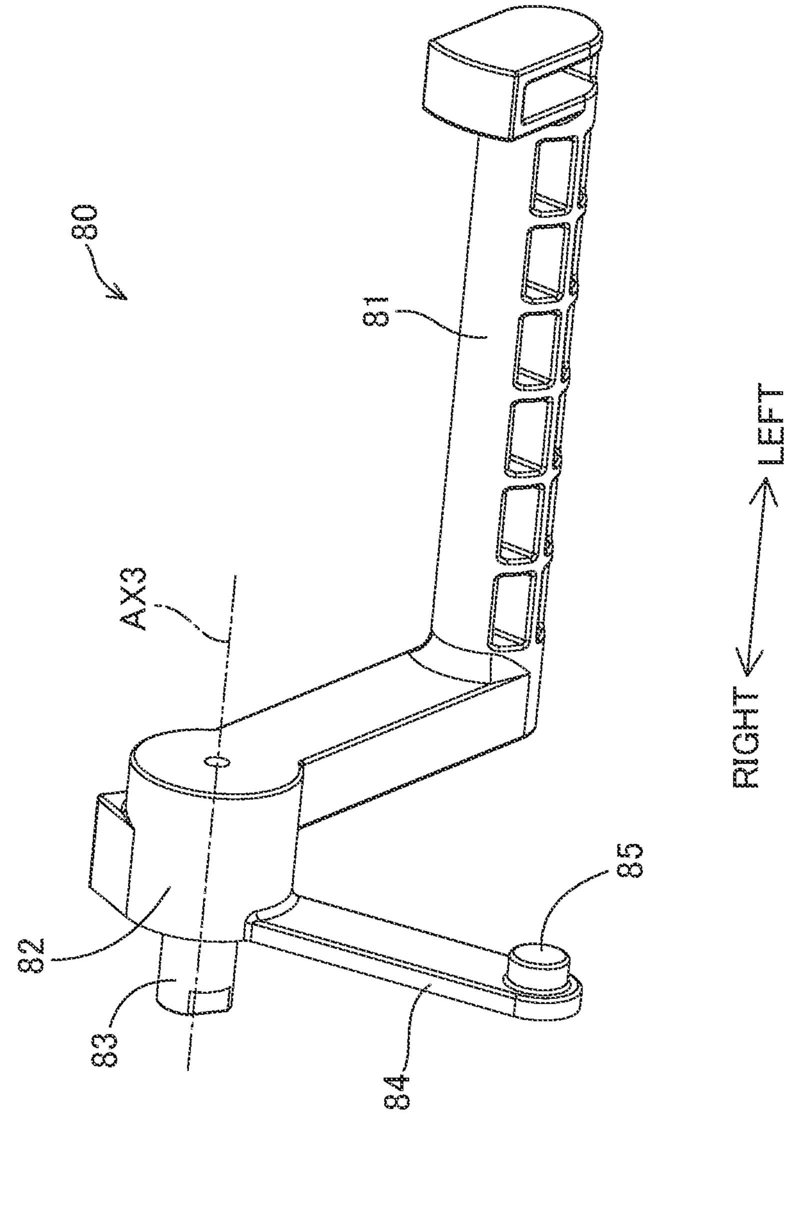
FIG. 9 is a perspective view of a lock operation mechanism.

The engagement portion 71 provided in this manner is configured to be interlocked with the lock operation mechanism 80. As illustrated in FIG. 9, the lock operation mechanism 80 includes an operation portion 81, a base portion 82, a coupling portion 83, an arm portion 84, and an abutment portion 85. The base portion 82 has a generally columnar shape. The operation portion 81 is a portion to be manually operated by the user, and is in the form of a generally L-shaped lever. The operation portion 81 extends from the base portion 82 radially outward, and, after that, is bent and extends leftward. The coupling portion 83 is a portion to be coupled with the engagement portion 71, and extends from the base portion 82 rightward in a columnar shape. As illustrated in FIGS. 14 and 15, the coupling portion 83 is coupled with the engagement portion 71 using a screw 74. The coupling portion 83 is disposed so as to extend through a through-hole of the cover main body 52, and therefore the engagement portion 71 and the lock operation mechanism 80 are supported pivotally about the pivotal axis AX3 by the cover main body 52 in an integrated state. The arm portion 84 extends from the base portion 82 radially outward at a circumferential position different from the operation portion 81. The abutment portion 85, which protrudes leftward (toward the gear housing 60 of the main body portion 30) in a columnar shape, is formed at the distal end of the arm portion 84.

The lock operation mechanism 80 provided in this manner is configured to be displaceable according to a manual operation between a blocking position, at which the lock operation mechanism 80 blocks the door 53 from being opened by the open/close mechanism 70 (refer to FIGS. 5 and 6), and a permission position, at which the lock operation mechanism 80 permits the door 53 to be opened by the open/close mechanism 70 (refer to FIG. 7). More specifically, the lock operation mechanism 80 is configured to be pivotal integrally with the engagement portion 71 as described above, and the engagement portion 71 is located at the close position when the lock operation mechanism 80 is located at the blocking position and is located at the open position when the lock operation mechanism 80 is located at the permission position. Therefore, the user can open the door 53 only when the lock operation mechanism 80 is displaced from the blocking position, which is an initial position, to the permission position.

As illustrated in FIG. 6, in a state that the main body portion 30 is located at the top dead center and the lock operation mechanism 80 is located at the blocking position, the lock operation mechanism 80 (more specifically, the operation portion 81) is located on the lower side with respect to a slide trajectory for slidably attaching he battery 45 onto the battery mount portion 46. Therefore, the battery 45 can be mounted onto the battery mount portion 46 without the lock operation mechanism 80 interfering with the slide trajectory. On the other hand, as illustrated in FIG. 7, in a state that the main body portion 30 is located at the top dead center and the lock operation mechanism 80 is located at the permission position, the lock operation mechanism 80 (more specifically, the operation portion 81) interferes with the slide trajectory of the battery 45. Therefore, the battery 45 cannot be mounted onto the battery mount portion 46. In other words, power is not supplied to the electric motor 33 when the lock operation mechanism 80 is located at the permission position, at which the door 53 is permitted to be opened. As a result, the user does not have to be careful not to rotate the saw blade 35 contrary to the user's intention when the door 53 is opened.

Figure 5:
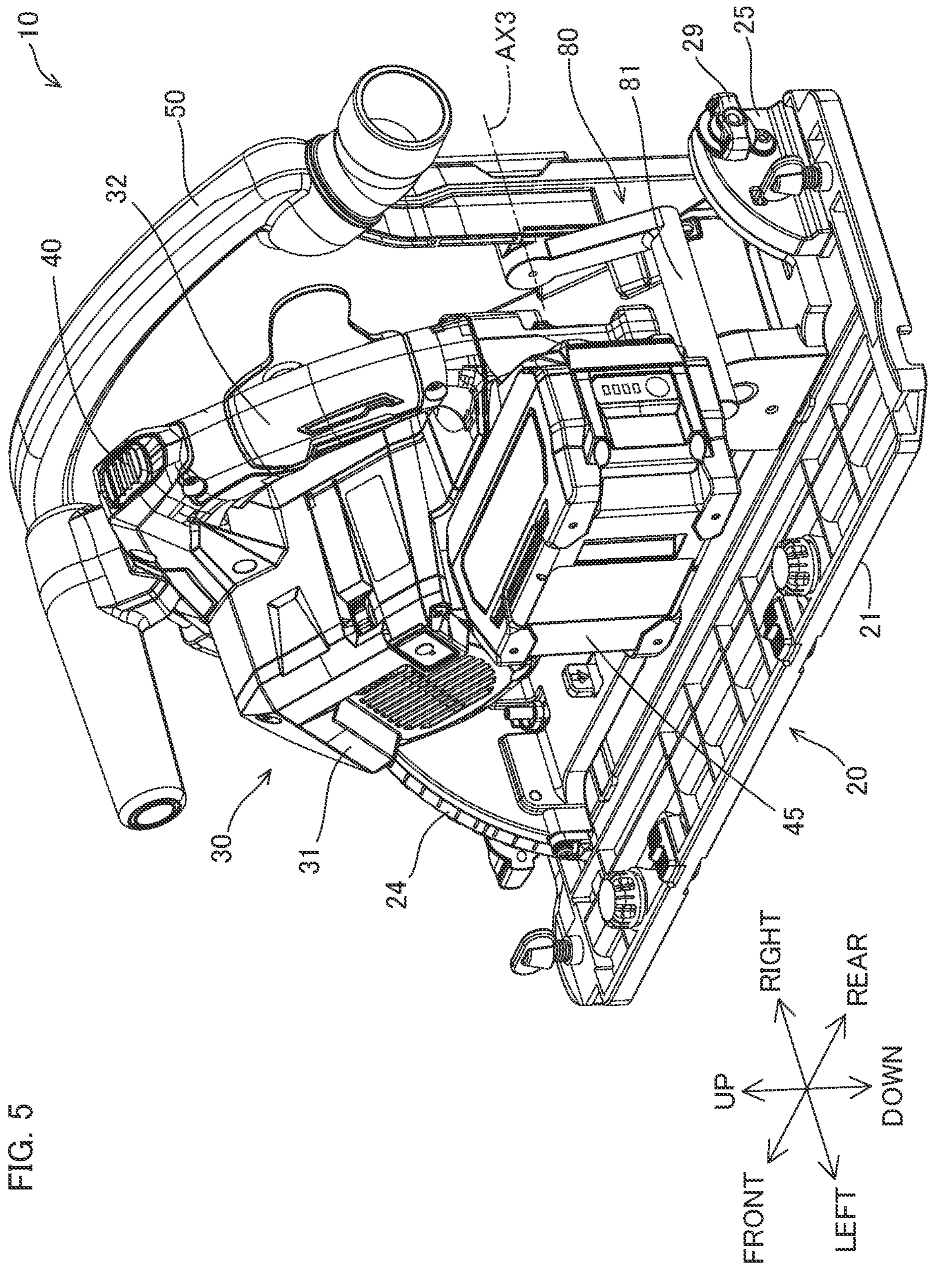
FIG. 5 is a perspective view of the circular saw and the main body portion is located at the top dead center.

As illustrated in FIG. 5, when the lock operation mechanism 80 is located at the blocking position, the distal end of the operation portion 81 of the lock operation mechanism 80 is located below the battery 45 in the state that the battery 45 is mounted on the battery mount portion 46. Therefore, even when the user tries to operate the lock operation mechanism 80 from the blocking position (refer to FIG. 5) toward the permission position (refer to FIG. 7), the operation portion 81 interferes with the battery 45. Therefore, the user cannot perform the operation of displacing the lock operation mechanism 80 from the blocking position to the permission position in the state that the battery 45 is mounted on the battery mount portion 46. On the other hand, as clearly seen from FIGS. 6 and 7, the lock operation mechanism 80 is allowed to be displaced from the blocking position to the permission position without interfering with another member in a state that the battery 45 is demounted. In other words, the user cannot operate the lock operation mechanism 80 for opening the door 53 unless the circular saw 10 is in an unusable state with no power supplied to the electric motor 33. As a result, the user does not have to perform the operation of opening/closing the door 53 carefully not to rotate the saw blade 35 contrary to the user's intention.

Figure 10:
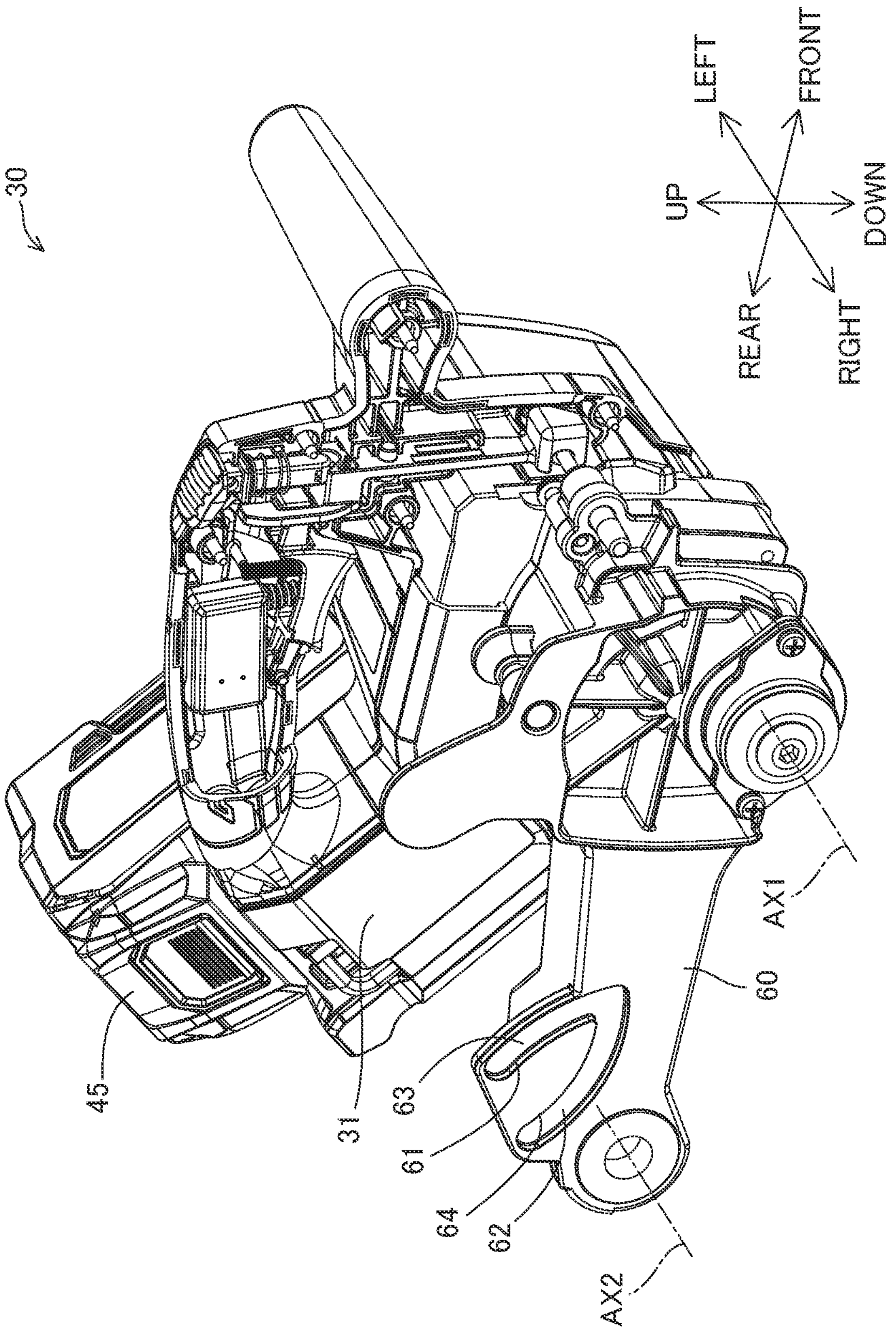
FIG. 10 is a perspective view with a part of components of the circular saw removed.

Further, the lock operation mechanism 80 is configured in such a manner that the displacement of the lock operation mechanism 80 from the blocking position to the permission position is permitted only when the main body portion 30 is located at the top dead center and is prohibited when the main body portion 30 is located at any position other than the top dead center. Now, such a configuration will be described with reference to FIGS. 10 to 13. As illustrated in FIG. 10, a first abutted portion 61, a retracted portion 62, a recessed portion 63, and a second abutted portion 64 are formed on the right surface of the gear housing 60.

The retracted portion 62 and the recessed portion 63 are in the form of a leftward. recessed groove. The retracted portion 62 and the recessed portion 63 are continuous to each other, and have a generally V-like shape as a whole (more precisely, a V-like shape formed by a circular arc). The first abutted portion 61 is a circular arc-shaped portion adjacent to the recessed portion 63, and forms a side wall of the recessed portion 63 along the recessed portion 63 (a side wall closer to the retracted portion 62). The second abutted portion 64 is a circular arc-shaped portion adjacent to the retracted portion 62, and forms a side wall of the retracted portion 62 along the retracted portion 62 (a side wall closer to the recessed portion 63). The retracted portion 62 and the recessed portion 63 are located at a leftward deeper position than the first abutted portion 61 and the second abutted portion 64.

The abutment portion 85 of the lock operation mechanism 80 (which protrudes in a direction in which the retracted portion 62 and the recessed portion 63 are recessed) is contained in the retracted portion 62 and the recessed portion 63. In other words, the abutment portion 85 is constantly located at a position that faces any one of the retracted portion 62 and the recessed portion 63 in the left-right direction. Which position the abutment portion 85 is located at, inside the retracted portion 62 or inside the recessed portion 63 varies depending on the pivotal position of the main body portion 30 and the pivotal position of the lock operation mechanism 80.

Figure 11:
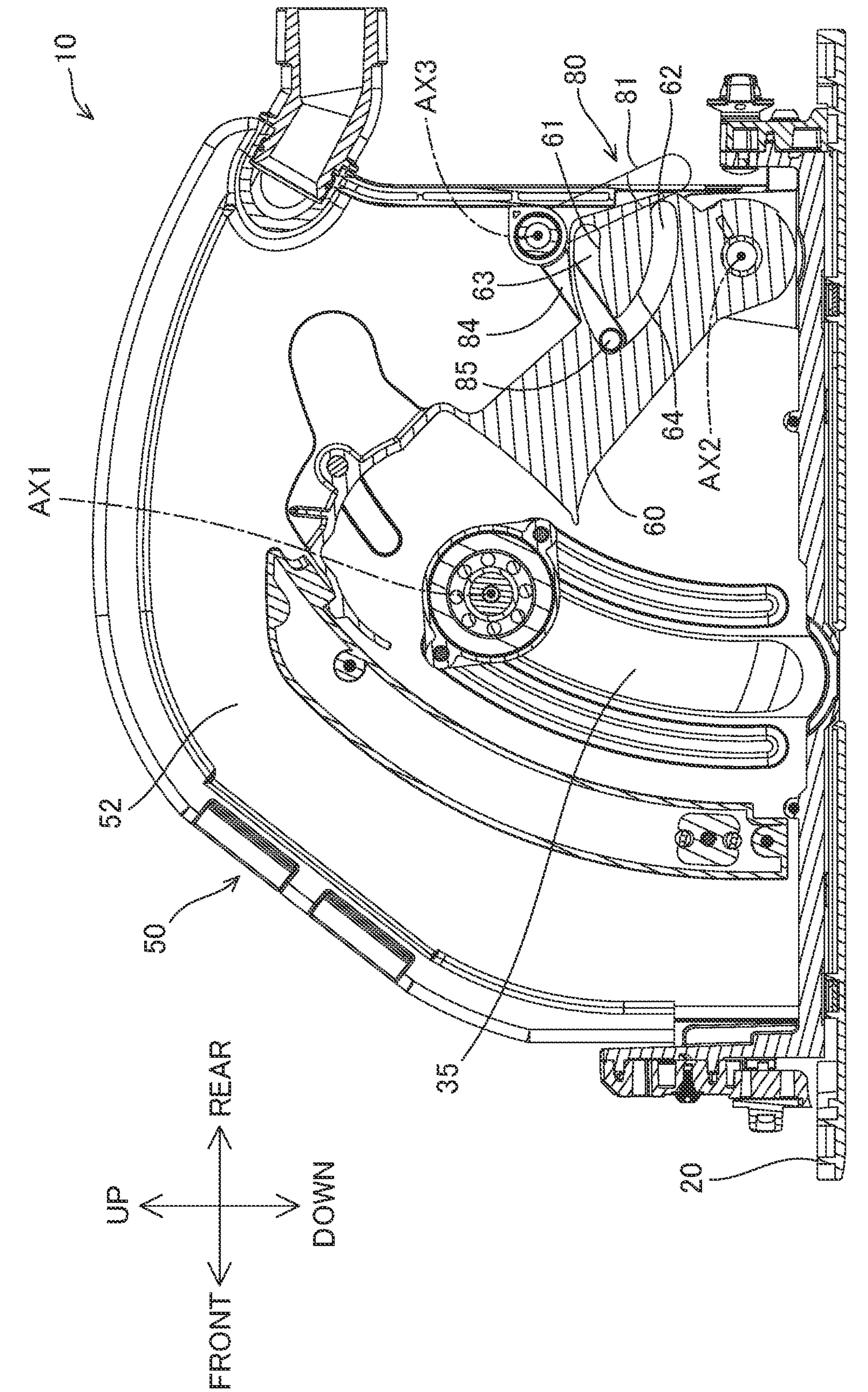
FIG. 11 is a cross-sectional view illustrating the positional relationship between the lock operation mechanism and a gear housing, and the main body portion is located at the top dead center and the lock operation mechanism is located at the blocking position.
Figure 12:
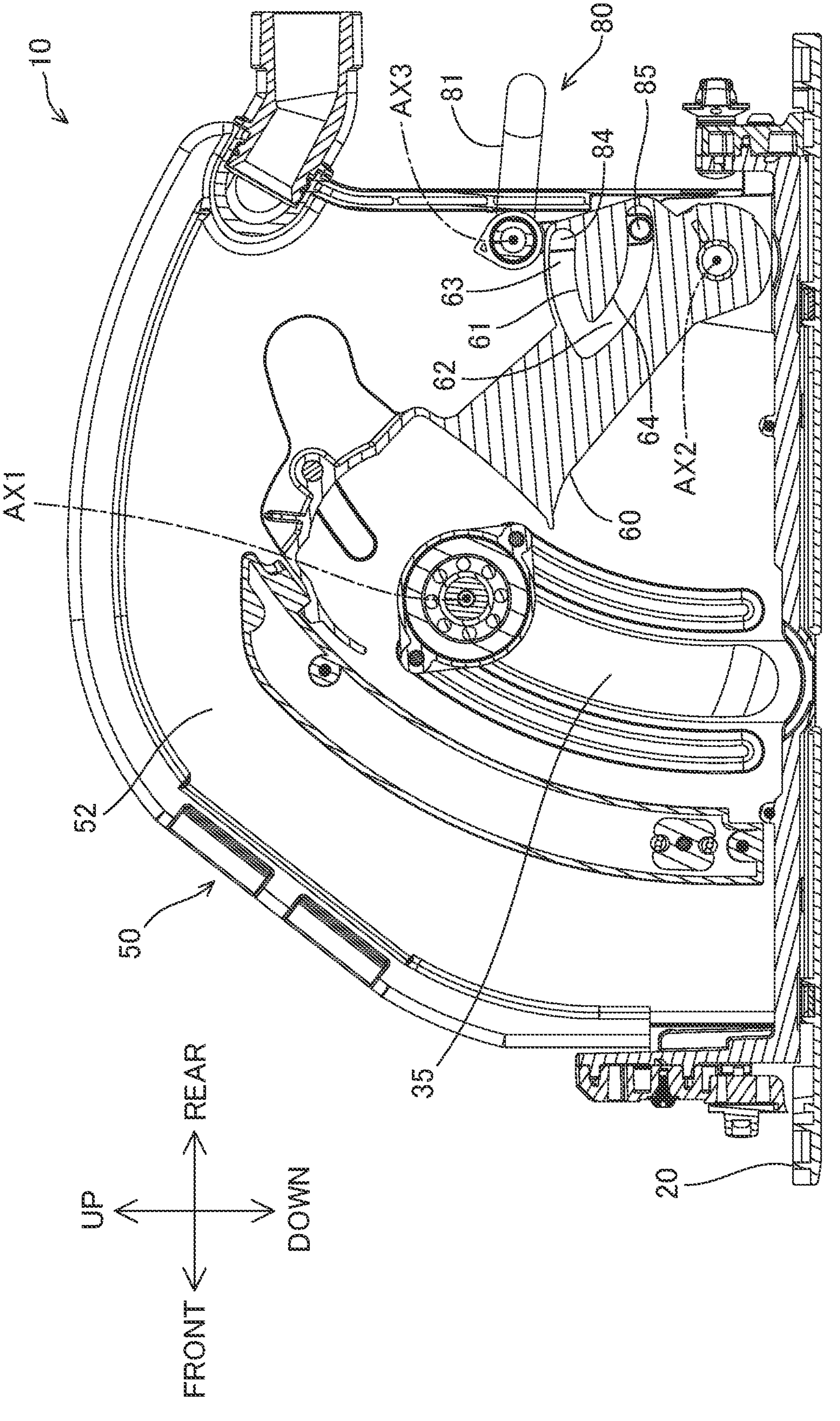
FIG. 12 is a cross-sectional view illustrating the positional relationship between the lock operation mechanism and the gear housing, and the main body portion is located at the top dead center and the lock operation mechanism is located at the permission position.

More specifically, as illustrated in FIG. 11, when the main body portion 30 is located at the top dead center and the lock operation mechanism 80 is located at the blocking position (i.e., the open/close mechanism 70 is located at the close position), the abutment portion 85 is located at a position that faces the proximal end of the retracted portion 62 (a portion thereof connected to the recessed portion 63). In this state, the lock operation mechanism 80 (i.e., the abutment portion 85) is permitted to be displaced from the blocking position to the permission position. More specifically, when the user displaces the lock operation mechanism 80 from the blocking position illustrated in FIG. 11 to the permission position illustrated in FIG. 12, the abutment portion 85 is moved from the position that faces the proximal end of the retracted portion 62 to a position that faces the distal end of the retracted portion 62 (the end portion thereof on the opposite side from the portion connected to the recessed portion 63) as illustrated in FIG. 12. The retracted portion 62 is located adjacent to the first abutted portion 61 but is located at the position retracted from the first abutted portion 61, and therefore this movement of the abutment portion 85 is not blocked by the abutment with the first abutted portion 61.

In the state illustrated in FIG. 12, i.e., when the main body portion 30 is located at the top dead center and the lock operation mechanism 80 is located at the permission position, the main body portion 30 is prohibited from being displaced from the top dead center toward the bottom dead center. More specifically, even when the user tries to displace the main body portion 30 toward the bottom dead center in the state illustrated in FIG. 12, the second abutted portion 64 is in abutment with the abutment portion 85 in a direction for prohibiting this displacement. As a result, the user cannot displace the main body portion 30 toward the bottom dead center.

On the other hand, in the state illustrated in FIG. 11, i.e., when the main body portion 30 is located at the top dead center and the lock operation mechanism 80 is located at the blocking position, the main body portion 30 is permitted to be displaced from the top dead center toward the bottom dead center. More specifically, when the user displaces the main body portion 30 to the bottom dead center in the state illustrated in FIG. 11, the abutment portion 85 is relatively moved to the position that faces the distal end of the recessed portion 63 (the end portion thereof on the opposite side from the portion connected to the retracted portion 62) in the recessed portion 63 as illustrated in FIG. 13.

Figure 13:
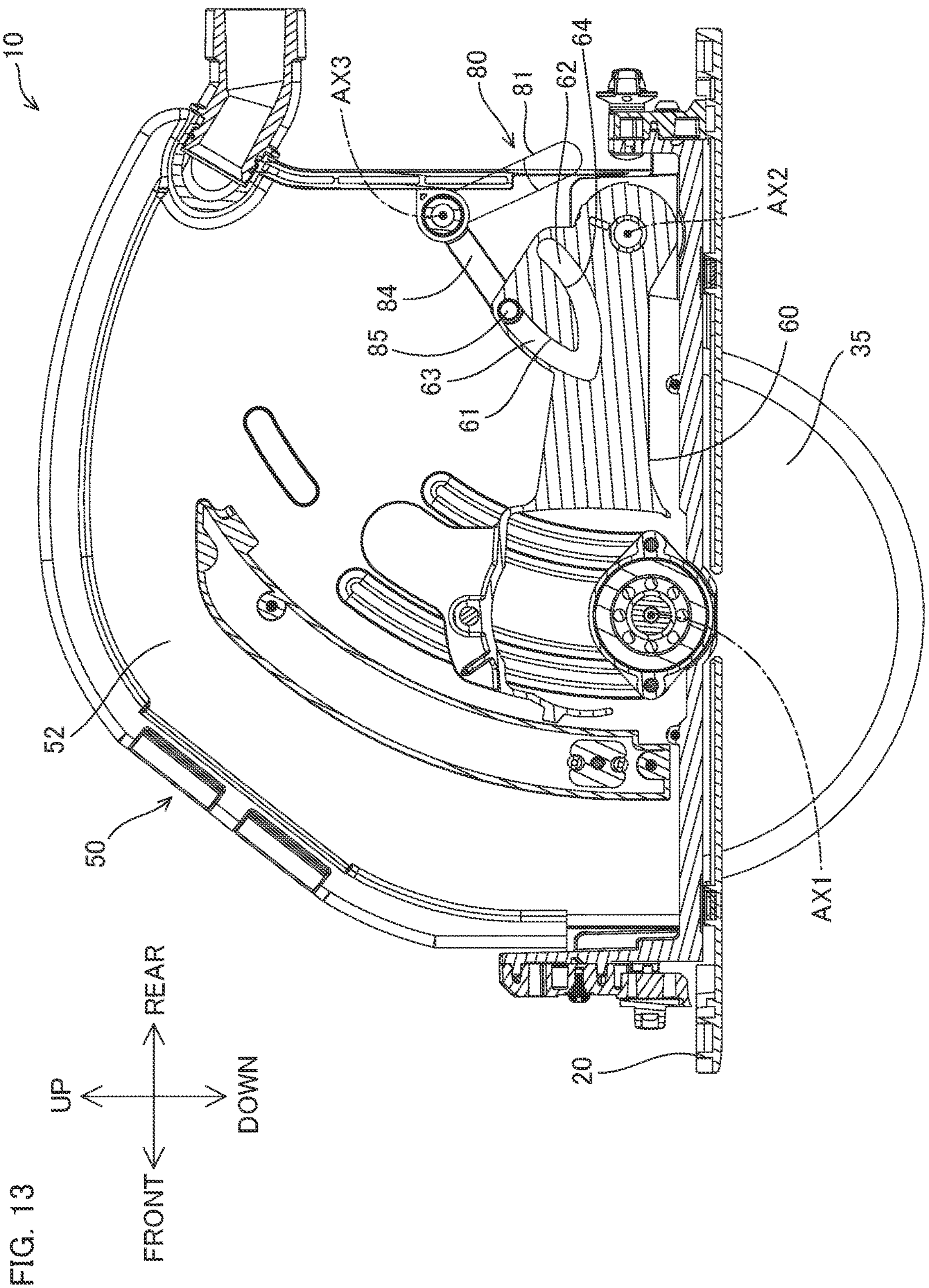
FIG. 13 is a cross-sectional view illustrating the positional relationship between the lock operation mechanism and the gear housing, and the main body portion is located at the bottom dead center and the lock operation mechanism is located at the blocking position.

In the state illustrated in FIG. 13, i.e., when the main body portion 30 is located at a position other than the top dead center and the lock operation mechanism 80 is located at the blocking position, the lock operation mechanism 80 (i.e., the abutment portion 85) is prohibited from being displaced from the blocking position to the permission position. More specifically, even when the user tries to displace the lock operation mechanism 80 from the blocking position toward the permission position in the state illustrated in FIG. 13, the abutment portion 85 is in abutment with the first abutted portion 61 in a direction for prohibiting this displacement. As a result, the user cannot displace the lock operation mechanism 80 toward the permission position.

As clearly understood from the above description, according to the circular saw 10, the lock operation mechanism 80 is allowed to be displaced from the blocking position corresponding to the initial position to the permission position to open the door 53 only when the main body portion

30 is located at the top dead center. Therefore, the circular saw 10 prevents occurrence of such a situation that the gear housing 60 and the lock operation mechanism 80 might strongly hit each other and incur damage as the main body portion 30 is moved from a position other than the top dead center to the top dead center in the state that the lock operation member 80 is displaced to the permission position. Therefore, the user does not have to carefully operate the circular saw 10 so as not to damage the circular saw 10 due to an erroneous operation when opening the door 53. As a result, the user's convenience is improved.

Further, according to the circular saw 10, the main body portion 30 is allowed to be displaced from the top dead center toward the bottom dead center to cut the cutting target material by the circular saw 10 only when the lock operation mechanism 80 is located at the blocking position (i.e., only when there is no possibility that the door 53 is opened). Therefore, the user can use the circular saw 10 without confirming whether the door 53 is opened (or whether the door 53 is in an openable state). As a result, the user's convenience is improved.

in addition, the lock operation mechanism 80 can realize the closed state lock function of blocking the door 53 from being opened when the main body portion 30 is located at a position other than the top dead center and the main body portion position lock function of prohibiting the main body portion 30 from being displaced from the top dead center toward the bottom dead center when the lock operation mechanism 80 is located at the permission position. As a result, the size of the circular saw 10 can be reduced compared to when these two functions are realized by individual different mechanisms, respectively.

Further, because both the engagement portion 71 of the open/close mechanism 70 and the lock operation mechanism 80 are supported by the cover main body 52, the engagement portion 71 and the lock operation mechanism 80 can be efficiently interlocked with a small number of components.

Further, as illustrated in FIG. 6, the engagement portion 71 and the lock operation mechanism 80 are located on the rear side with respect to the rotational axis AX1 of the saw blade 35, i.e., the rear side closer to a position where the user stands when using the circular saw 10. Therefore, the user can easily operate the lock operation mechanism 80. In addition, the distance between the engagement portion 71 and the lock operation mechanism 80 is reduced, and therefore the engagement portion 71 and the lock operation mechanism 80 can be interlocked with a compact structure. Further, the hinge mechanism 54 for opening and closing the door 53 is disposed on the front side with respect to the rotational axis AX1 of the saw blade 35 (i.e., the front side farther from the engagement portion 71 and the lock operation mechanism 80). Therefore, the distance between the engagement portion 71 and the hinge mechanism 54 is increased, and therefore a further reliable operation of opening and closing the door 53 can be realized.

Further, as illustrated in FIG. 11, the abutment portion 85 and the first abutted portion 61 are disposed at positions closer to the pivotal axis AX2 of the main body portion 30 than to the rotational axis AX1 of the saw blade 35. In other words, the distances between the pivotal axis AX2, and the abutment portion 85 and the first abutted portion 61 are shorter than the distances between the rotational axis AX1, and the abutment portion 85 and the first abutted portion 61. Therefore, the distances between the abutment portion 85 and the first abutted portion 61, and the pivotal axis AX2 are reduced. This can lead to a reduction in a range in the circumferential direction about the pivotal axis AX2 where the first abutted portion 61 should be provided to allow the first abutted portion 61 to function properly throughout the entire angular range of the pivotal motion of the main body portion 30. In other words, the size of the first abutted portion 61 can be reduced.

The circular saw 10 further includes an additional configuration for blocking the circular saw 10 from being used in a state that the door 53 is opened. Such a configuration will be described now. As illustrated in FIGS. 14 and 15, the open/close mechanism 70 includes a compression spring 75 and a lock member 76. As illustrated in FIGS. 6 and 7, the lock member 76 is disposed adjacent to the engagement portion 71 below the engagement portion 71. FIG. 6 illustrates a state in which a part of the cover main body 52 (the right-side portion disposed on the rear-side edge portion) is removed, but, actually, this part is attached and only the lock member 76 is accessible through a through-hole 56 and the engagement portion 71 is inaccessible from the right side of the cover main body 52 as illustrated in FIG. 8.

As illustrated in FIGS. 14 and 15, the lock member 76 includes an engagement portion 77 protruding upward and a pressed portion 78 protruding rightward in a columnar shape. A step 79 is formed at the proximal end of the pressed portion 78. The lock member 76 is constantly biased rightward (i.e., the direction for opening the door 53) by the compression spring 75 disposed in a compressed state between the left-side portion of the cover main body 52 and the lock member 76.

As illustrated in FIG. 14, when the door 53 is closed (the door 53 is held in the closed state due to the engagement between the engagement portion 71 and the engagement portion 55) in a state that a protrusion 57 provided on the door 53 enters inside the cover 50 via the through-hole 56, the protrusion 57 presses the pressed portion 78 leftward against the biasing force of the compression spring 75. In this state, the engagement portion 77 is retracted to the left side with respect to the engagement portion 71 and does not interfere with the motion of the engagement portion 71 at all as illustrated in FIGS. 6 and 14. As a result, the engagement portion 71 interlocked with the lock operation mechanism 80 is allowed to be displaced from the close position (refer to FIG. 6) to the open position (refer to FIG. 7).

On the other hand, when the engagement portion 71 is displaced from the close position (refer to FIG. 6) to the open position (refer to FIG. 7), holding of the closed state of the door 53 (i.e., the pressing force of the protrusion 57) is released. At this time, the lock member 76 is pressed rightward under the biasing force of the compression spring 75, and is displaced rightward until the step 79 abuts against the right-side inner surface of the cover main body 52. At this time, the lock member 76 (more specifically, the pressed portion 78) presses the door 53 rightward, thereby causing the door 53 to be opened by an amount corresponding to the displacement of the lock member 76 as illustrated in FIG. 15. Further, as illustrated in FIGS. 7 and 15, the engagement portion 77 is placed at the same position as the engagement portion 71 in the left-right direction according to the displacement of the lock member 76. At this time, as clearly seen from FIG. 7, the engagement portion 77 interferes with the displacement of the engagement portion 71 from the open position (refer to FIG. 7) to the close position (refer to FIG. 6). In other words, the engagement portion 71 cannot be displaced from the open position (refer to FIG. 7) to the close position (refer to FIG. 6) in a state that the door 53 is even slightly opened.

According to such a configuration, basically, the user cannot displace the lock operation mechanism 80 interlocked with the engagement portion 71 from the permission position to the blocking position in the state that the door 53 is opened. Without the lock operation mechanism 80 located at the blocking position, the main body portion 30 cannot be displaced from the top dead center toward the bottom dead center. As a result, the user does not have to pay attention to an unintentional exposure of the saw blade 35 from the cover 50 in the state that the door 53 is opened, and thus the user's convenience is improved.

However, if the user sticks his/her finger in the through-hole 56 and presses the pressed portion 78 leftward with his/her finger, the lock member 76 is displaced to the position illustrated in FIG. 14, and therefore the main body portion 30 can be displaced from the top dead center toward the bottom dead center while this state is maintained. According to such a configuration, a cut chip or the like present between the left-side portion of the cover main body 52 and the saw blade 35 can be easily removed by displacing the saw blade 35 to the bottom dead center side in a state that the battery 45 is demounted.

Further, according to the above-described configuration, the door 53 is automatically slightly opened under the biasing force of the compression spring 75 when the engagement portion 71 is displaced according to the operation on the lock operation mechanism 80. As a result, a slight gap is generated between the door 53 and the right-side outer surface of the cover main body 52 as illustrated in FIG. 15. The user can easily open the door 53 by sticking his/her finger in this gap.

Figure 19:
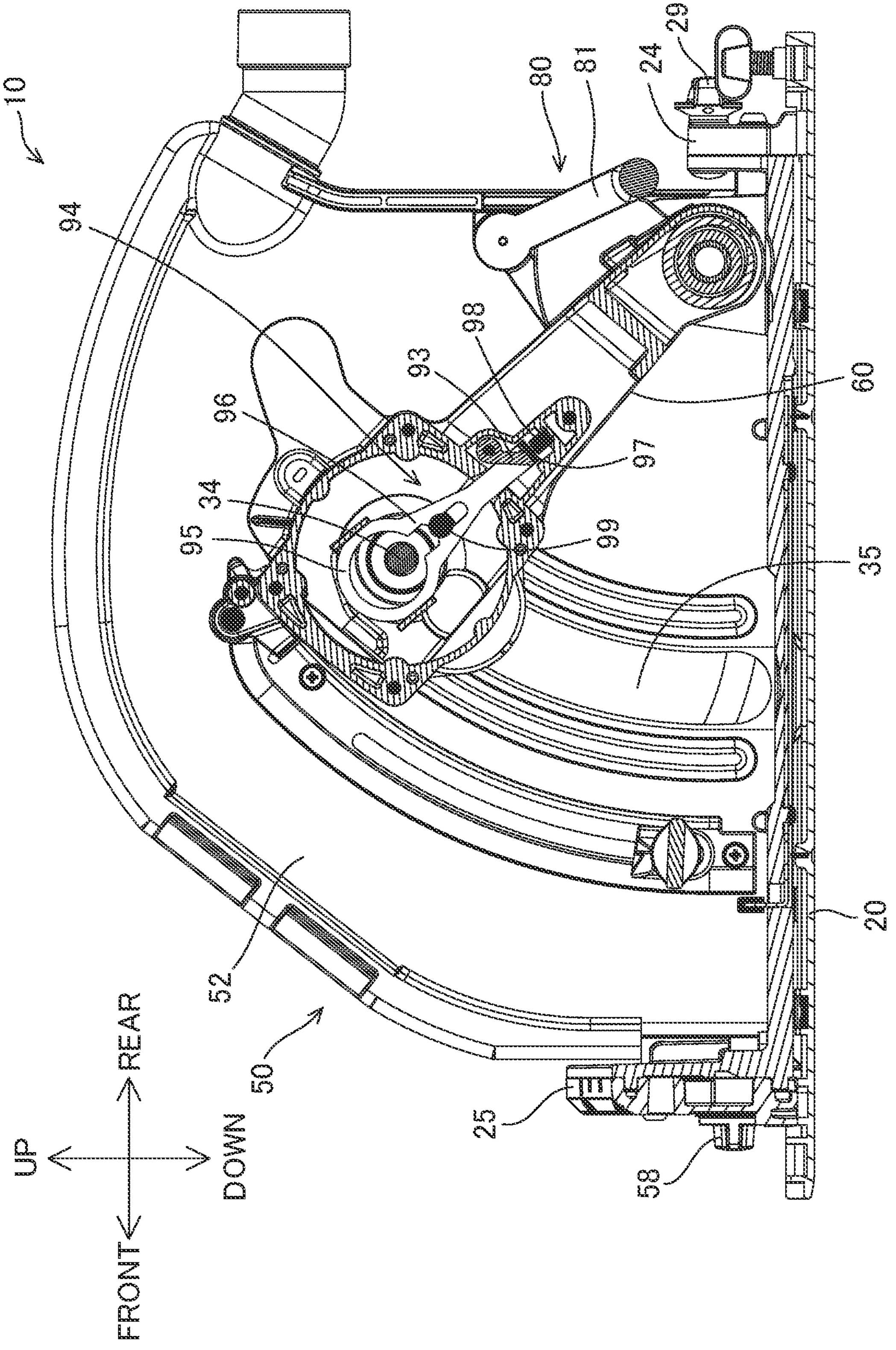
FIG. 19 is a vertical cross-sectional view of the circular saw, and the engagement member is located at a non-engagement position.
Figure 20:
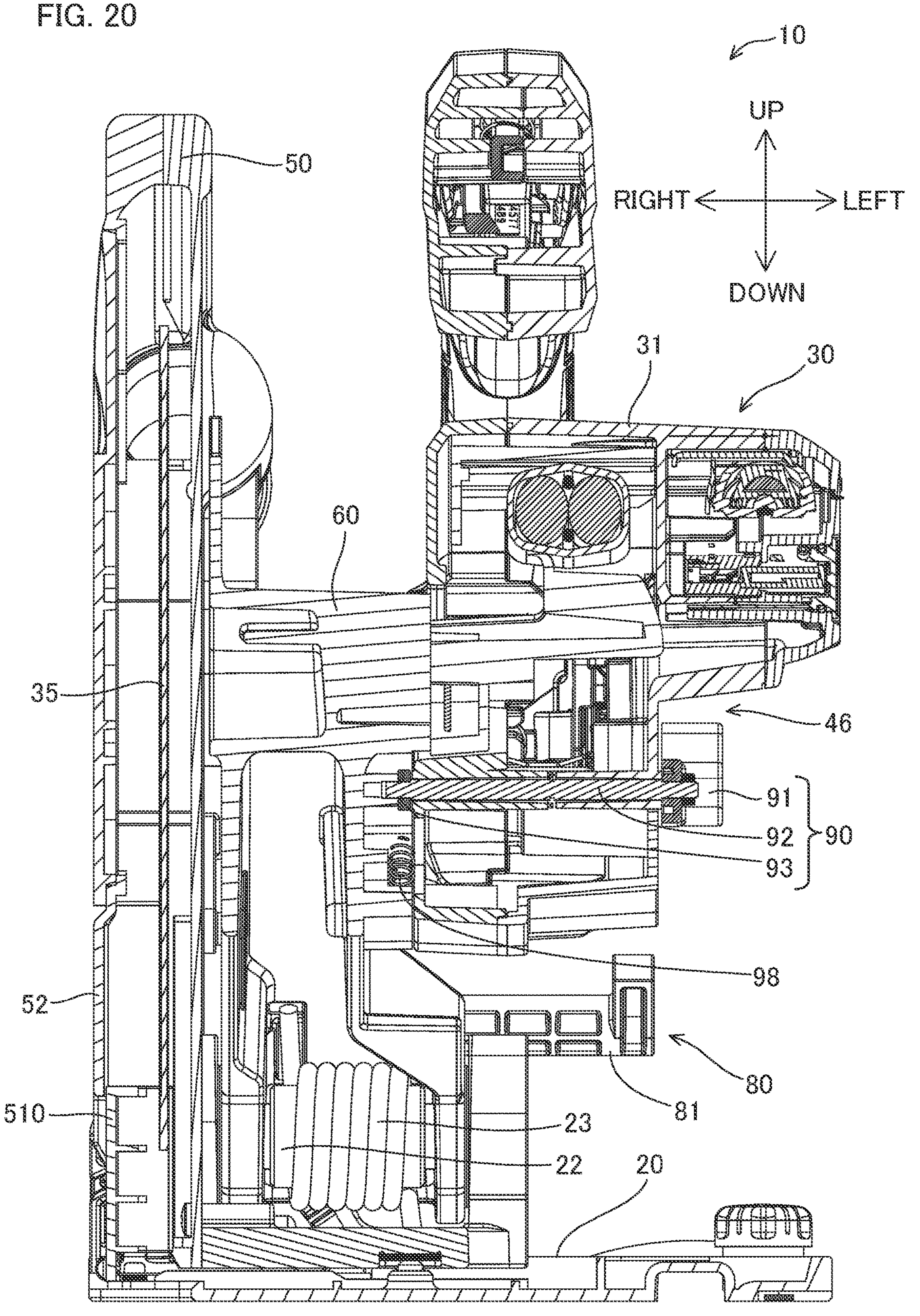
FIG. 20 is a vertical cross-sectional view of the circular saw.

The circular saw 10 further includes a configuration for facilitating work of replacing the saw blade 35. Such a configuration will be described now with reference to FIGS. 16 to 20. The circular saw 10 includes an operation member 90 and an engagement member 94. As illustrated in FIG. 20, the operation member 90 includes a knob 91, a shaft 92, and a pressing portion 93. The knob 91 is disposed so as to be exposed to outside the battery mount portion 46. The pressing portion 93 is disposed inside the gear housing 60. The shaft 92 rotatably extends through the motor housing 31, and couples the knob 91 and the pressing portion 93.

Figure 17:
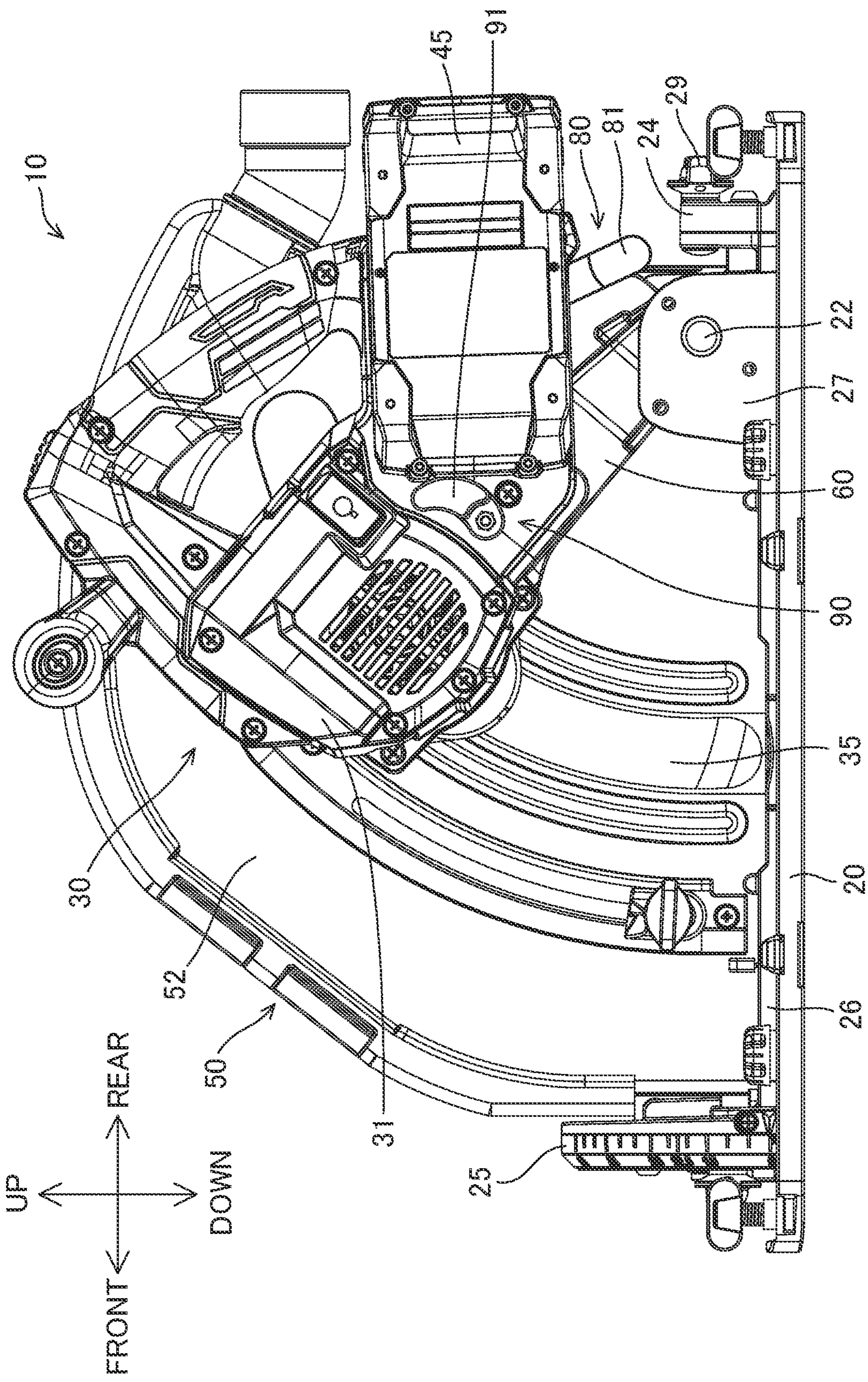
FIG. 17 is a left side view of the circular saw illustrating a state in which the battery is mounted.

As illustrated in FIGS. 16 and 17, the knob 91 has a circular arc shape. The operation member 90 is located at an initial position illustrated in FIG. 16 when the battery 45 is not mounted on the battery mount portion 46, and is pivotally moved to a pressed position illustrated in FIG. 17 by being pressed by the battery 45 when the battery 45 is mounted on the battery mount portion 46. At this time, the shaft 92 and the pressing portion 93 integrated with the knob 91 are also pivotally moved together with the knob 91.

Figure 18:
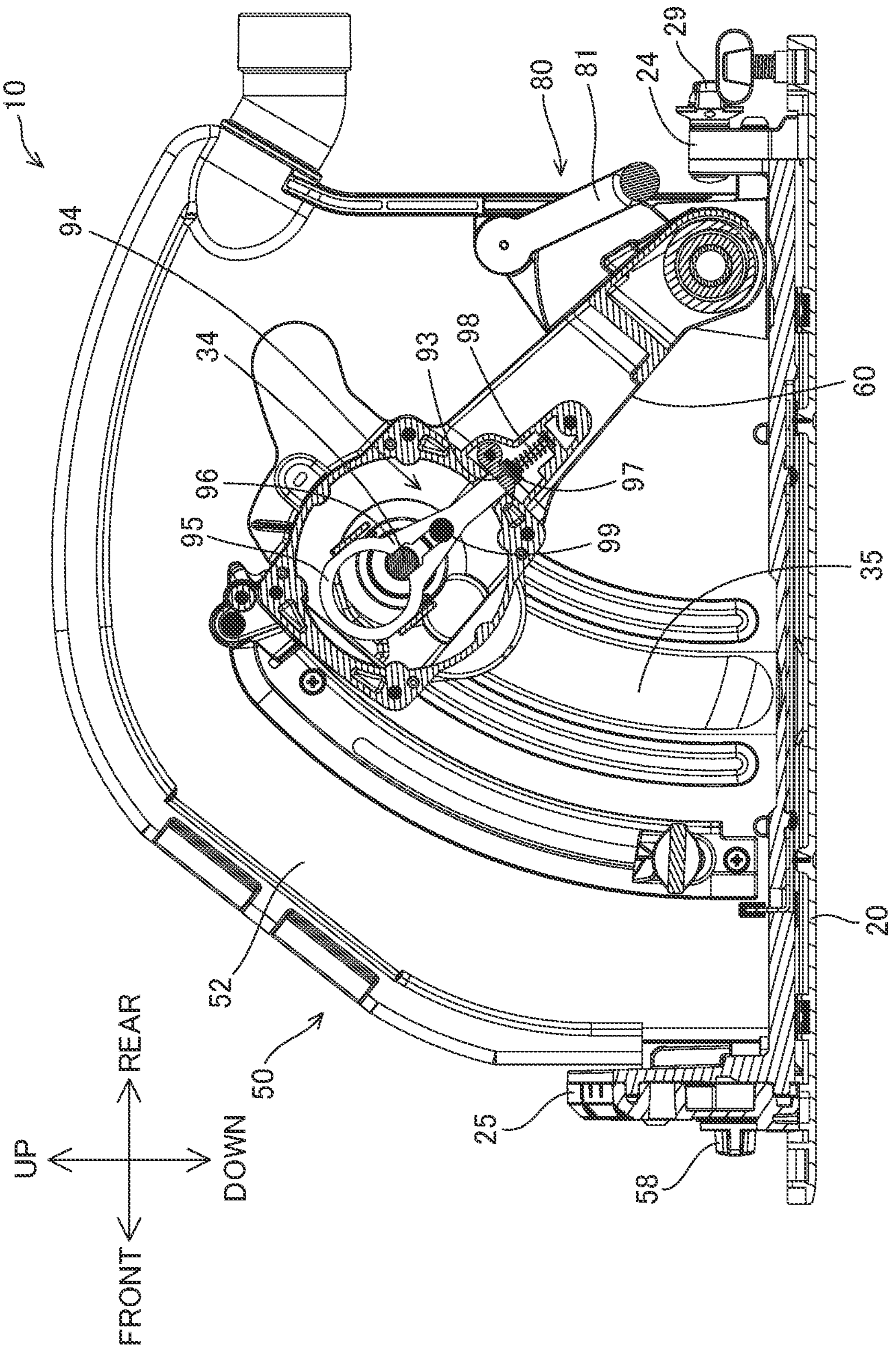
FIG. 18 is a vertical cross-sectional view of the circular saw, and an engagement member is located at an engagement position.

The engagement member 94 is disposed inside the gear housing 60. As illustrated in FIGS. 18 and 19, the engagement member 94 includes an annular portion 95 and a pressed portion 97 at one end and the other end thereof in the longitudinal direction, respectively. The annular portion 95 is disposed in such a manner that the motor shaft 34 extends through a through-hole formed inside the annular portion 95. The pressed portion 97 is a portion protruding leftward. An engagement portion 96 is formed at a position closer to the other end of the engagement member 94 than the annular portion 95. The engagement portion 96 includes a through-hole significantly smaller in width than the through-hole of the annular portion 95. The engagement member 94 configured in this manner is held by a pin 99 displaceably in the longitudinal direction thereof between an engagement position illustrated in FIG. 18 and a non-engagement position illustrated in FIG. 19. The engagement member 94 is constantly biased in a direction for moving the pressed portion 97 toward the motor shaft 34 (i.e., toward the engagement position) by a compression spring 98 disposed in a compressed state between the gear housing 60 and the pressed portion 97.

When the battery 45 is not mounted on the battery mount portion 46, the engagement member 94 is located at the engagement position illustrated in FIG. 18. At this time, the motor shaft 34 is fitted inside the engagement portion 96, and the motor shaft 34 and the engagement portion 96 are in an engaged state. Therefore, the rotation of the motor shaft 34 is blocked at least when the electric motor 33 is not driven. At this time, the shaft 92 is in abutment with the pressed portion 97 but does not press the pressed portion 97.

On the other hand, when the battery 45 is mounted on the battery mount portion 46, the operation member 90 is pivotally moved as described above. According thereto, the pressing portion 93 presses the pressed portion 97 against the biasing force of the compression spring 98 as illustrated in FIG. 19. As a result, the engagement member 94 is displaced from the engagement position illustrated in FIG. 18 to the non-engagement position illustrated in FIG. 19. Due to this displacement, the engaged state between the motor shaft 34 and the engagement portion 96 is released, and the motor shaft 34 is permitted to be rotated. Therefore, in the state that the battery 45 is mounted, the engagement member 94 does not affect the rotation of the motor shaft 34. When the battery 45 is demounted, the pressing portion 93 (the operation member 90) and the engagement member 94 are returned to the positions illustrated in FIG. 18 under the biasing force of the compression spring 98.

According to the above-described configuration, the rotation of the motor shaft 34 is blocked by performing only a simple operation of demounting the battery 45. Therefore, the motor shaft 34 is blocked from being rotated together when the flange 36 is loosened and tightened using a box wrench or the like to replace the saw blade 35. As a result, the user can easily perform the work of replacing the saw blade 35, and thus the user's convenience is improved.

Further, the circular saw 10 includes a configuration capable of tilting; the saw blade 35 by a larger tilt angle than the conventional plunge circular saw. Such a configuration will be described now mainly with reference to FIGS. 21 to 24. As illustrated in FIGS. 1 and 2, the cover 50 includes an auxiliary cover 500 that functions as a part of the right-side portion of the cover 50. The auxiliary cover 500 is disposed so as to function as a part of a portion of the cover 50 that is located in proximity to the base 20 (i.e., as a part of the lower edge portion of the right-side portion of the cover 50). As will be described in detail below, the auxiliary cover 500 is configured to be movable relative to the cover main body 52.

Figure 22:
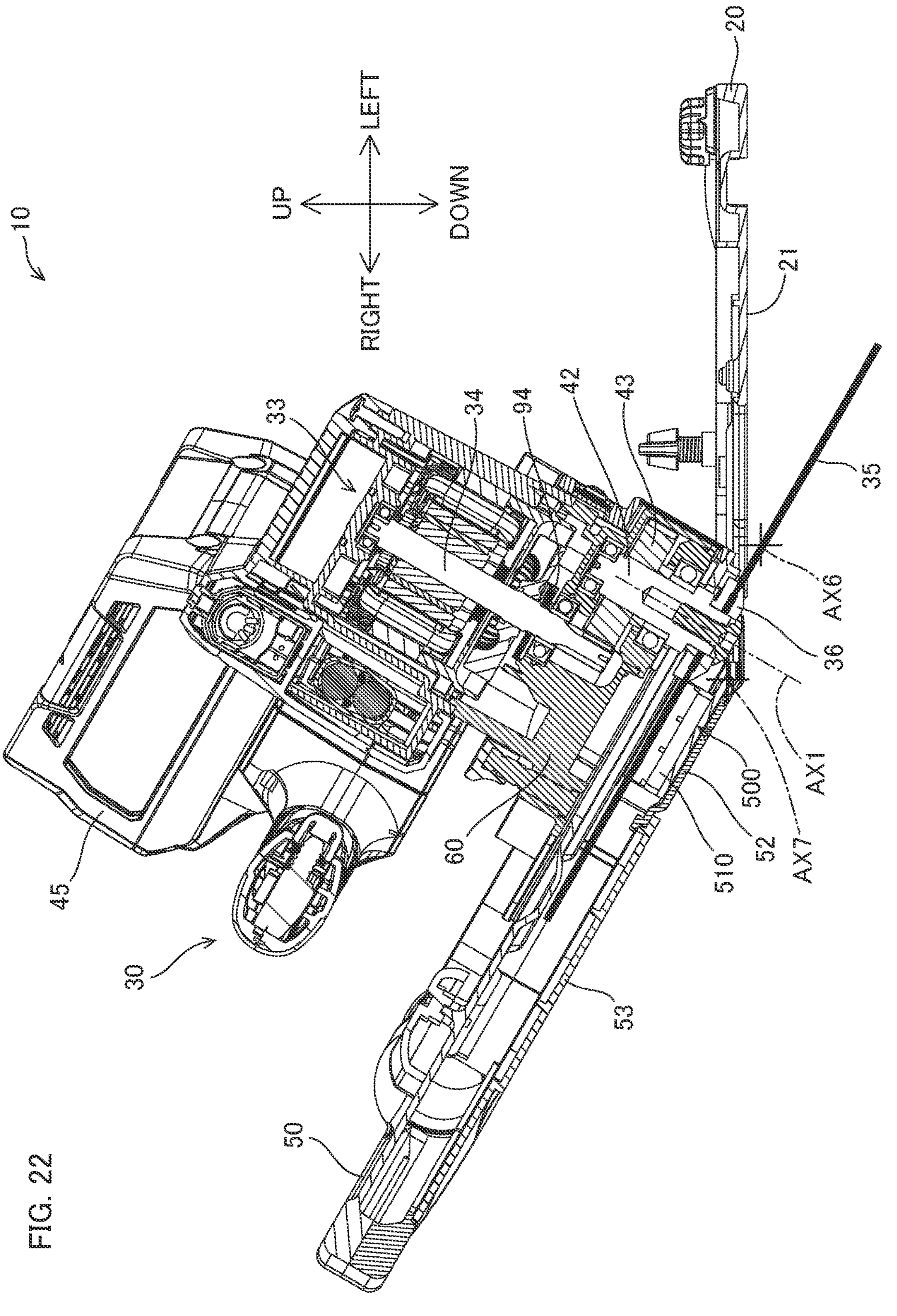
FIG. 22 is a vertical cross-sectional view of the circular saw illustrating a state in which the main body portion and the cover are tilted by a maximum tilt angle.

As described above, the main body portion 30 and the cover main body 52 can be tilted with respect to the base 20 by loosening the finger screws 28 and 29 provided on the angular plates 24 and 25, respectively. This tilt motion is performed about a first tilt axis AX6 (refer to FIG. 22). As illustrated in FIG. 22, the first tilt axis AX6 is located on the lower side with respect to the base 20. A plurality of bump and dent portions having a circular arc shape is formed on each of the rear surface of the angular plate 24 and the front surface of the front-side circular arc portion of the angular 26, and these respective bump and dent portions are engaged with each other, thereby serving as a guide for the tilt motion. The center of the bump and dent portions having the circular arc shape coincides with the first tilt axis AX6. The same also applies to the front surface of the angular plate 25 and the rear surface of the rear-side circular arc portion of the angular 26.

Figure 23:
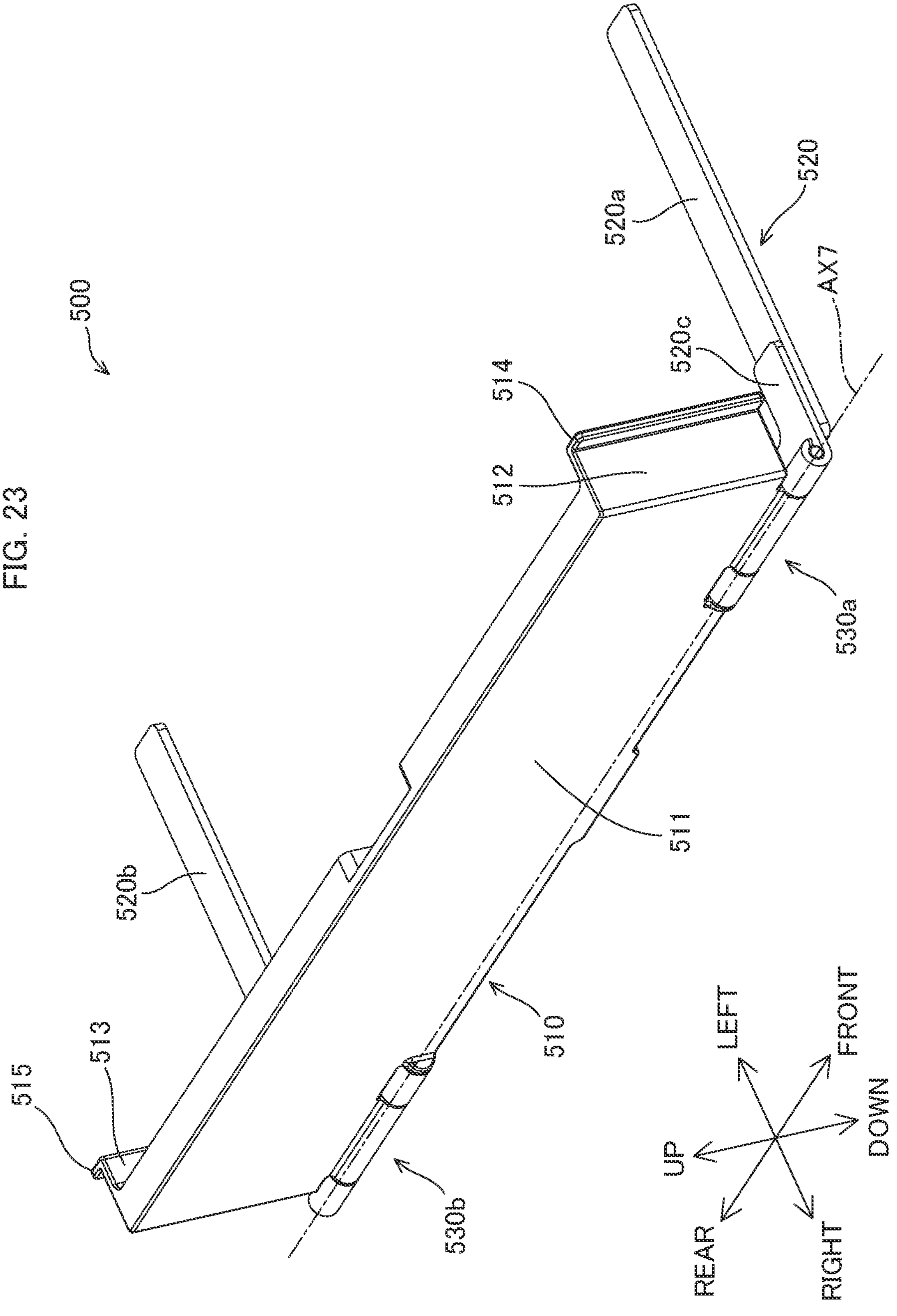
FIG. 23 is a perspective view of an auxiliary cover in the state that the main body portion and the cover are not tilted.

As illustrated in FIG. 23, the auxiliary cover 500 includes a cover member 510 for covering the side of the saw blade 35, and a support member 520 for supporting the cover member 510. The cover member 510 includes a first portion 511, a second portion 512, a third portion 513, and abutment portions 514 and 515. The first portion 511 has a generally rectangular shape, and covers the side of the saw blade 35 as illustrated in FIG. 1. As illustrated in FIG. 8, the width of the first portion 511 in the front-rear direction is set in such a manner that the first portion 511 extends to outside the saw blade 35 in the front-rear direction.

The second portion 512 and the third portion 513 extend from both the edge portions of the first portion 511 in the longitudinal direction (the front-rear direction) toward the inner side of the cover 50 (the inner side where the saw blade 35 is located) so as to be located opposite from each other. The abutment portions 514 and 515 extend from the left, edges of the second portion 512 and the third portion 513 in directions away from the first portion 511 in parallel with the first portion 511, respectively.

Figure 24:
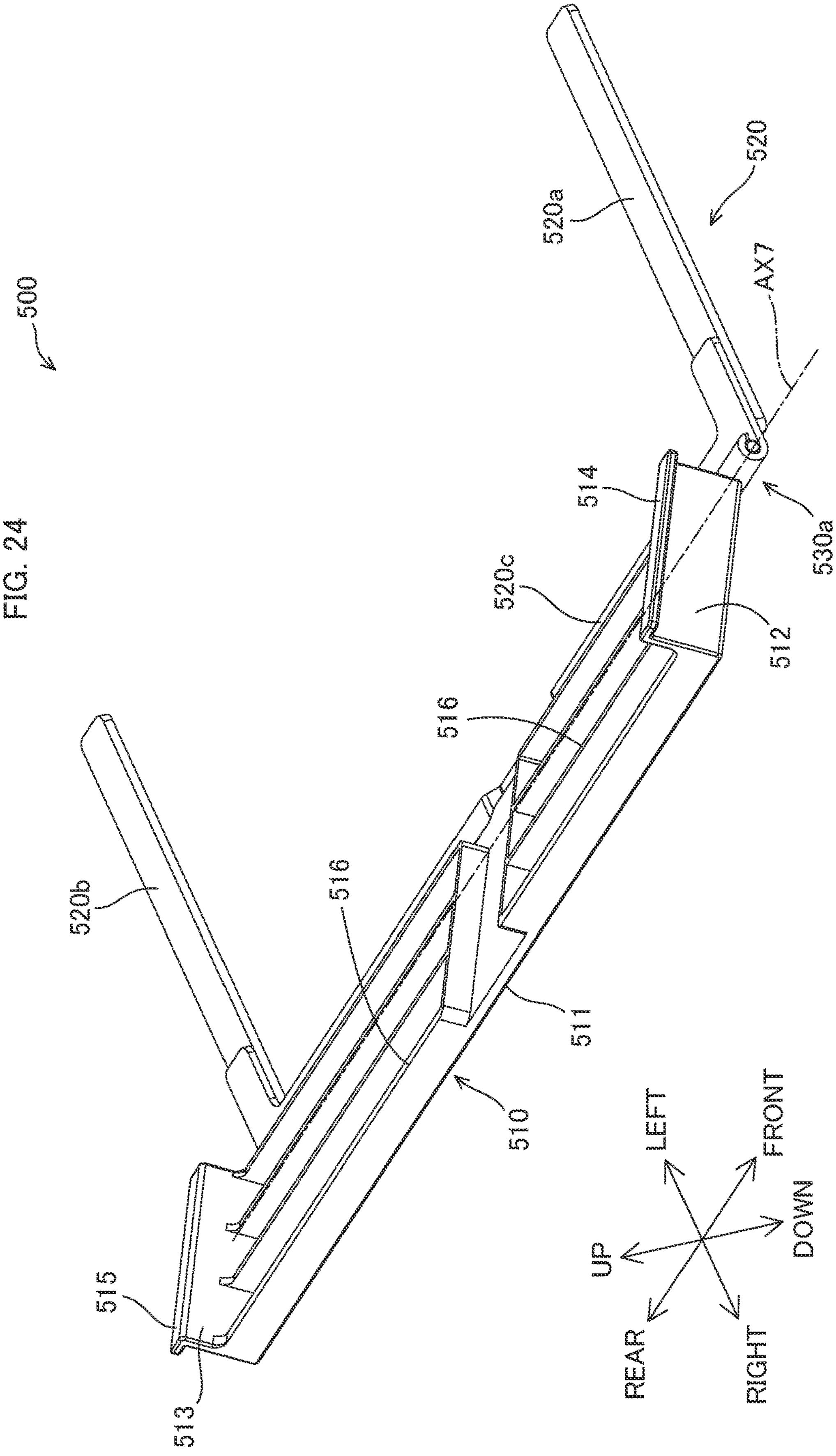
FIG. 24 is a perspective view of the auxiliary cover in the state that the main body portion and the cover are tilted by the maximum tilt angle.

As illustrated in FIG. 24, the cover member 510 is reinforced by a plurality of ribs 516 extending in the longitudinal direction thereof. The ribs 516 are not formed at the central portion of the cover member 510 in the longitudinal direction to avoid interference with the flange 36 when the main body portion 30 and the cover 50 are tilted.

Figure 25:
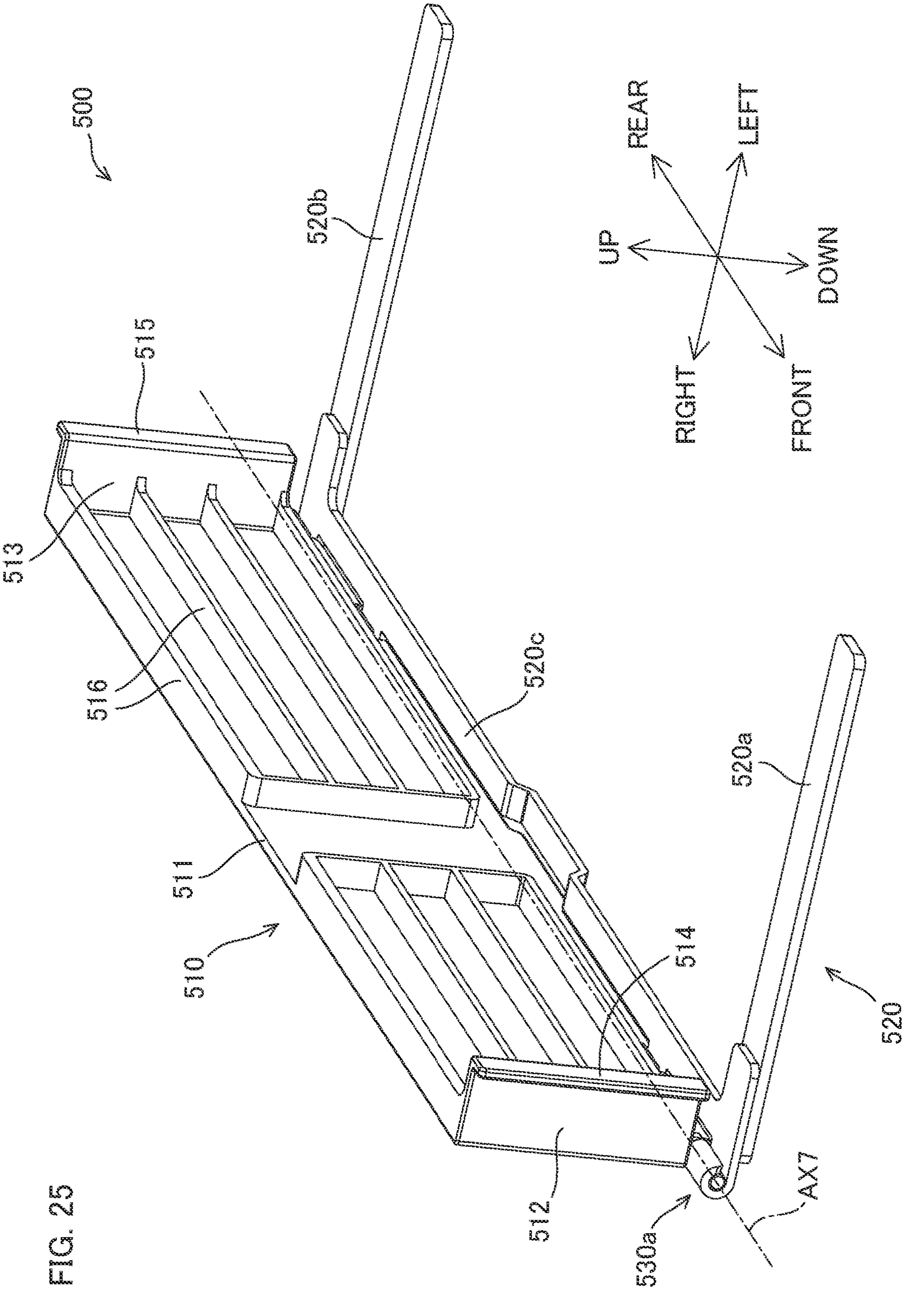
FIG. 25 is a perspective view of the auxiliary cover in the state that the main body portion and the cover are not tilted.
Figure 26:
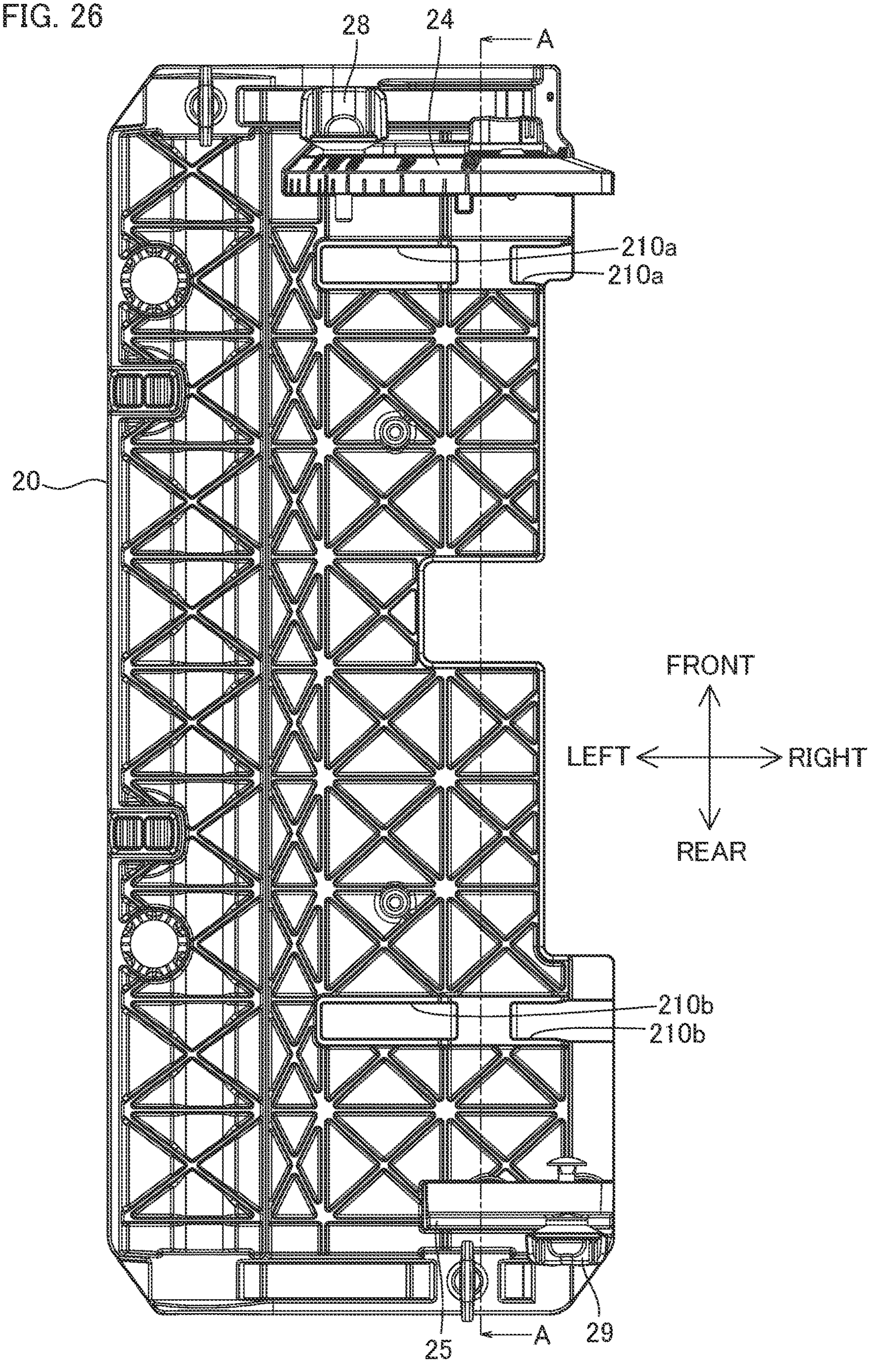
FIG. 26 is a plan view of a base.

As illustrated in FIG. 25, the support member 520 includes a first support portion 520*a*, a second support portion 520*b*, and a bridge portion 520*c*. The first support portion 520*a* and the second support portion 520*b* are each shaped like a simple elongate plate. The bridge portion 520*c* is shaped like a plate having a longitudinal direction that extends in the front-rear direction, and includes a hinge portion at the right edge thereof. The bridge portion 520*c* is integrated with the first support portion 520*a* and the second support portion 520*b* on the left sides of the front portion and the rear portion by welding. The first support portion 520*a* and the second support portion 520*b* are disposed around the front edge and the rear edge of the cover member 510 via the bridge portion 520*c*, respectively. Hinge mechanisms 530*a* and 530*b* are formed by a part of the bridge portion 520*c* and a part of the cover member 510. The hinge mechanisms 530*a* and 530*b* are located at both the edge portions in the longitudinal direction and the lower edge portions in the lateral direction of the cover member 510, respectively. Due to such a configuration, the support member 520 supports the cover member 510 tiltably about a second tilt axis AX7 as illustrated in FIGS. 23 to 25. The first support portion 520*a* and the second support portion 520*b*, which are spaced apart from each other in the front-rear direction, support the cover member 510 via the bridge portion 520*c*, thereby allowing the cover member 510 to be further stably tilted.

The first support portion 520*a* and the second support portion 520*b* are disposed in such a manner that the vertical positions of the first support portion 520*a* and the second support portion 520*b* are fixed. In the present embodiment, the first support portion 520*a* and the second support portion 520*b* are disposed on the base 20 movably in the left-right direction. The first support portion 520*a* and the second support portion 520*b* are disposed on the base 20, and this causes the second tilt axis AX7 of the cover member 510 to be located on the upper side with respect to the lower surface 21 of the base 20.

Figure 27:
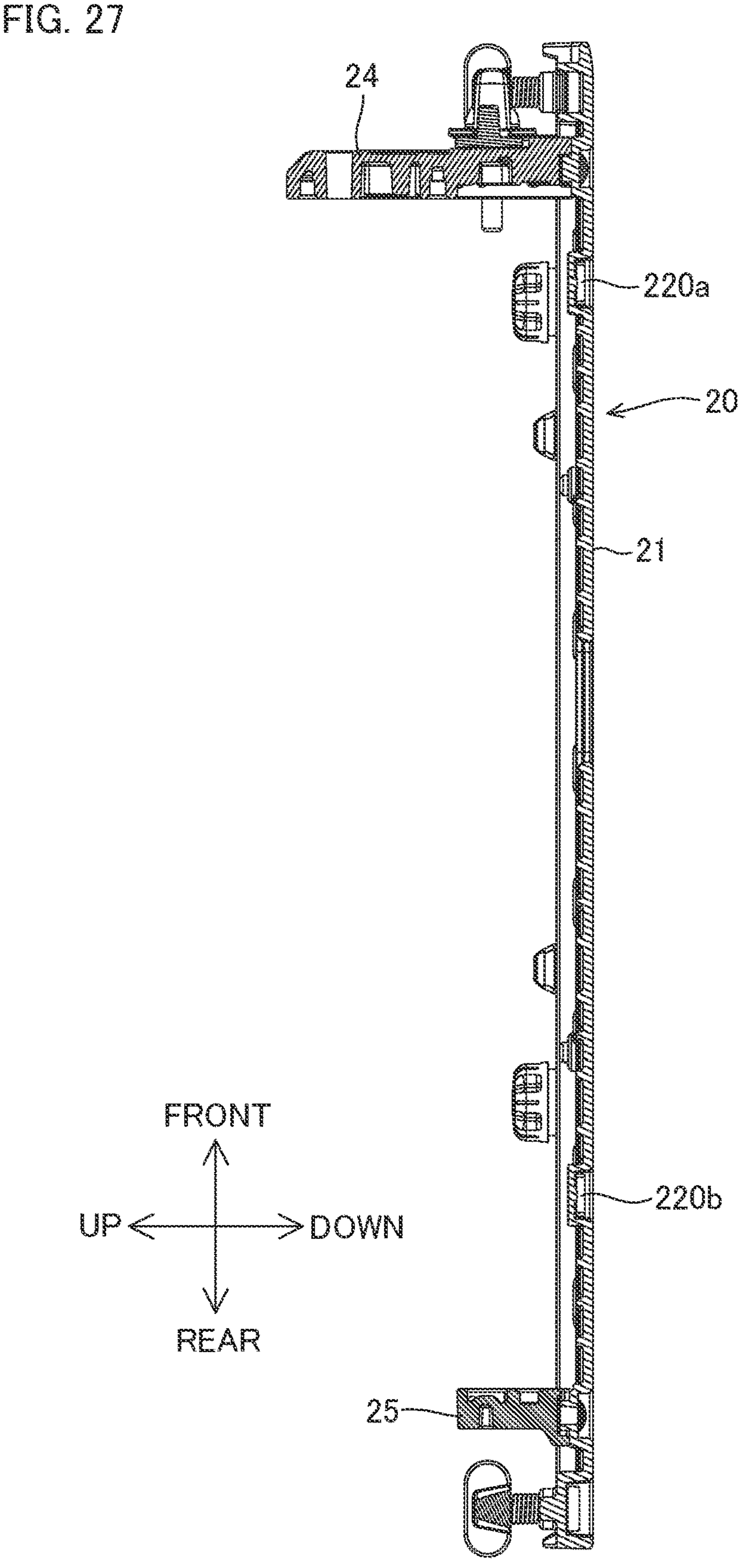
FIG. 27 is a cross-sectional view taken along a line A-A illustrated in FIG. 26.

More specifically, as illustrated in FIG. 27, the base 20 includes two through-holes 220*a* and 220*b* extending through the base 20 in the left-right direction, which are disposed at two positions corresponding to the first support portion 520*a* and the second support portion 520*b*, respectively. The first support portion 520*a* and the second support portion 520*b* are disposed so as to be slidable on the base 20 in states of being inserted through the through-holes 220*a* and 220*b*, respectively. According to such a configuration, the first support portion 520*a* and the second support portion 520*b* can be reliably held on the base 20. Further, two guide grooves 210*a* and 210*b* extending in the left-right direction are formed on the base 20. The first support portion 520*a* and the second support portion 520*b* are contained in the guide grooves 210*a* and 210*b*, respectively. According to this configuration, the first support portion 520*a* and the second support portion 520*b* can be prevented from being angled with respect to the left-right direction. As a result, the slidability in the left-right direction is stabilized.

The auxiliary cover 500 provided in this manner is configured in such a manner that the auxiliary cover 500 is tilted about the pivotal axis AX2 in conjunction with the tilt motion of the cover main body 52 about the first tilt axis AX6. Such an interlocked motion will be described now. As illustrated in FIG. 1, the auxiliary cover 500 is disposed in such a manner that the upper edge portion of the cover member 510 is located inside the cover main body 52 (the upper edge portion of the cover member 510 is located on the upper side with respect to the lower edge portion of the cover main body 52). Further, as illustrated in FIG. 6, the auxiliary cover 500 is disposed in such a manner that the abutment portions 514 and 515 are placed in abutment with the left-side inner surface of the cover main body 52 (more specifically, a protrusion portion 52*b* protruding rightward) (only the abutment between the abutment portion 514 and the left-side inner surface of the cover main body 52 can be confirmed in FIG. 6). The abutment portions 514 and 515 are also placed in abutment with the right-side inner surface of the cover main body 52 (more specifically, a protrusion portion protruding leftward), although the illustration thereof is omitted. In other words, the abutment portions 514 and 515 are interposed between the protrusion portion 52*b* on the left-side inner surface of the cover main body 52 and the protrusion portion on the right-side inner surface of the cover main body 52.

Figure 21:
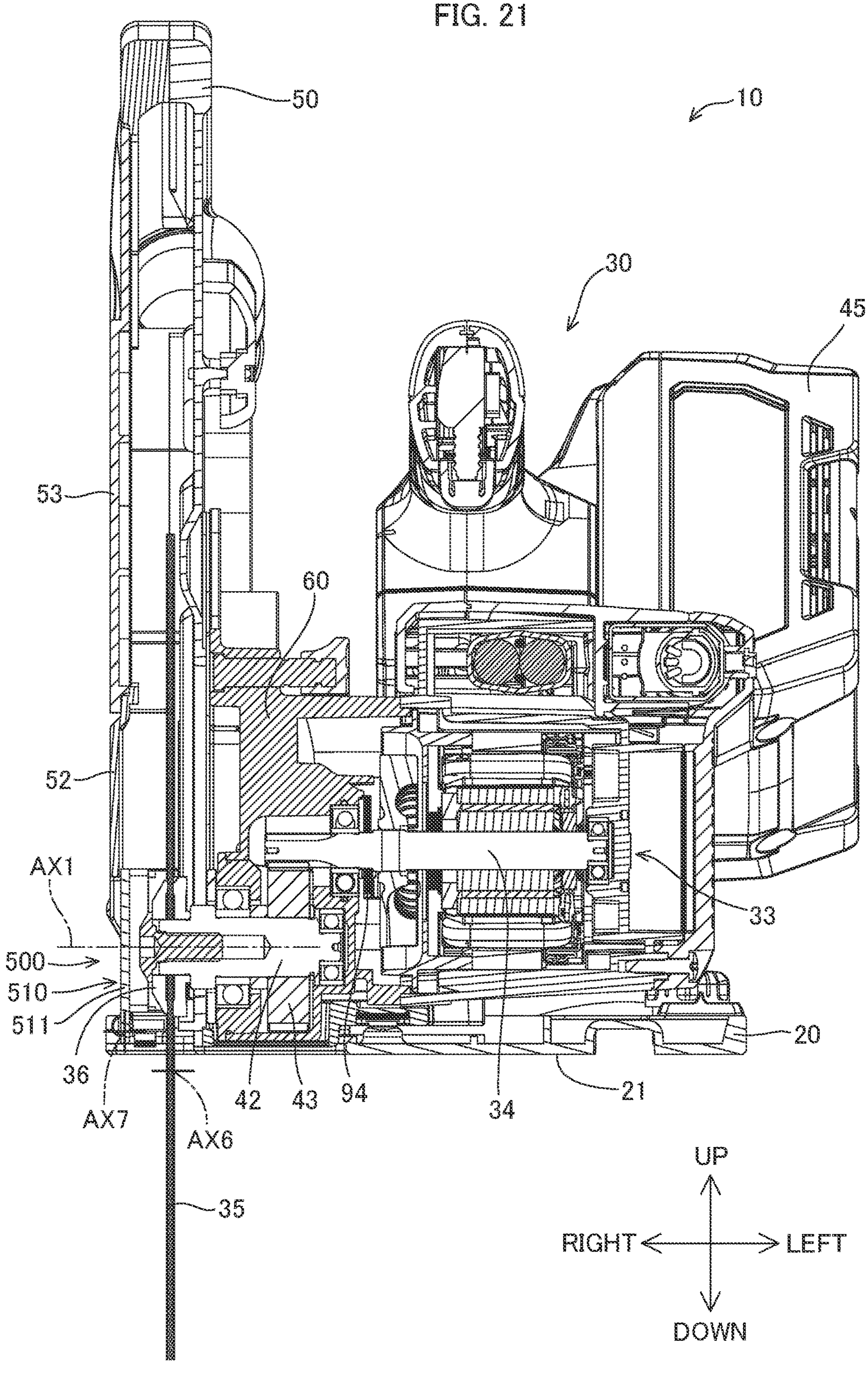
FIG. 21 is a vertical cross-sectional view of the circular saw illustrating a state in which the main body portion and the cover are not tilted.

As illustrated in FIG. 21, in a state that the main body portion 30 and the cover main body 52 are not tilted with respect to the base 20 and the main body portion 30 is located at the bottom dead center, the auxiliary cover 500 (more specifically, the first portion 511 of the cover member 510) and the rotational axis AX1 of the saw blade 35 overlap each other when being viewed from the direction in which the rotational axis AX1 extends (the left-right direction). At this time, as illustrated in FIG. 2, the cover member 510 extends downward to a position where almost no space is generated between the cutting target material and the cover member 510 when the base 20 is placed on the cutting target material, and can sufficiently cover the side of the saw blade 35.

When the main body portion 30 and the cover main body 52 are tilted with respect to the base 20 about the first tilt axis AX6 from the state illustrated in FIG. 21 by a maximum tilt angle (60 degrees) illustrated in FIG. 22, the left-side portion of the cover main body 52 presses the abutment portions 514 and 515 of the cover member 510 in the direction in which the cover main body 52 is tilted. According thereto, the cover member 510 is tilted about the second tilt axis AX7.

Figure 28:
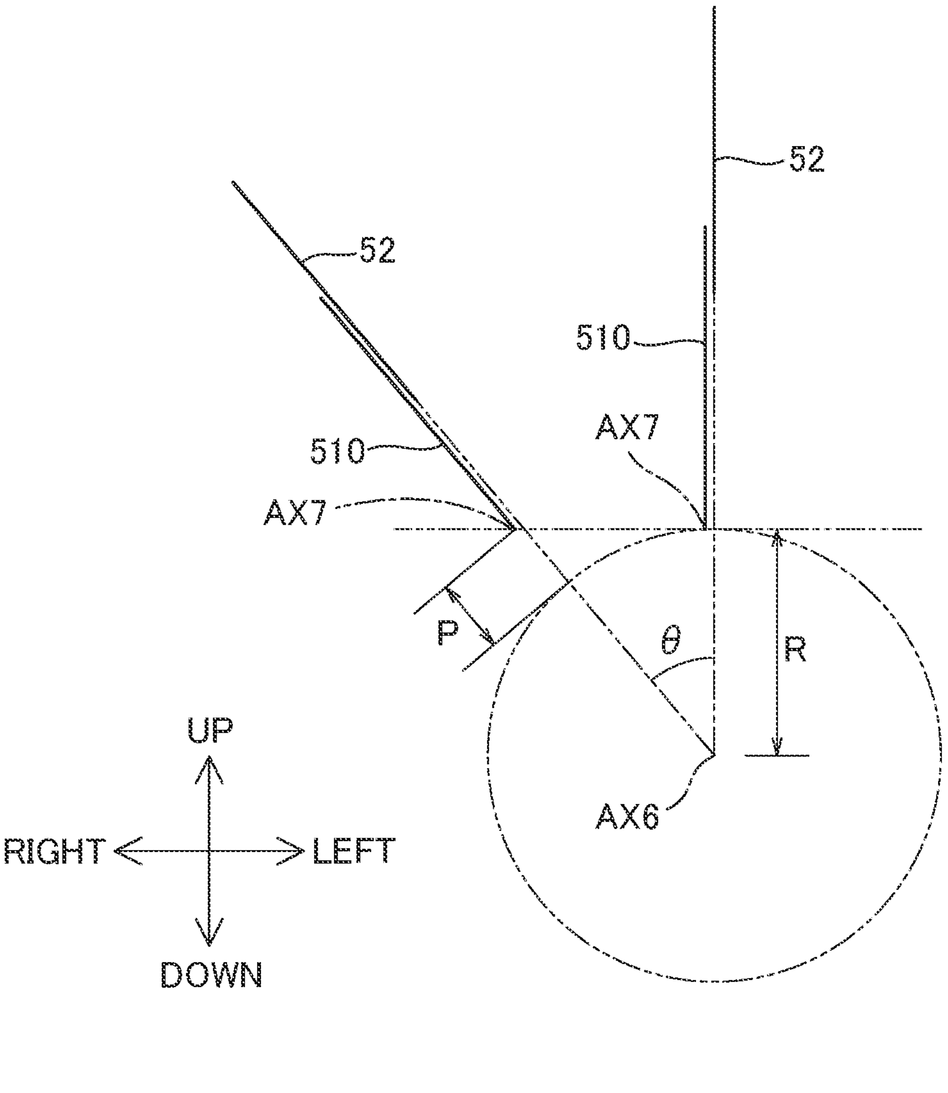
FIG. 28 is a schematic view illustrating the relationship between the tilt of a cover main body and a cover member and a movement amount of the cover member.

At this time, the first support portion 520*a* and the second support portion 520*b* are slid rightward (i.e., in a direction perpendicular to the second tilt axis AX7, in parallel with the base 20, and toward the outer side of the base 20) so as to compensate for inconsistency between the first tilt axis AX6 and the second tilt axis AX7. In other words, the cover member 510 is tilted while moving the second tilt axis AX7 rightward. According to such a motion, the cover main body 52 and the cover member 510 are moved relative to each other vertically (in a direction in which the cover main body 52 and the cover member 510 extend in parallel with each other) in such a manner that the cover member 510 is moved upward relative to the cover main body 52. Now, assuming that R represents the vertical distance between the first tilt axis AX6 and the second tilt axis AX7, P represents the relative movement amount of the cover member 510, and θ represents the tilt angle, an equation $P=(R/\cos\theta)-R$ is established (in this equation, a misalignment in the left-right direction between the first tilt axis AX6 and the second tilt axis AX7 is ignored for convenience) (refer to FIG. 28). This means that, when the two tilt axes AX6 and AX7 extend with the vertical distance R therebetween, the movement amount P expressed as $(R/\cos\eta)-R$ is necessarily generated. The series of motions of the auxiliary cover 500 utilizes a trigonometrically expressible movement in this manner.

At this time, because the second tilt axis AX7 is located on the upper side with respect to the lower surface 21 of the base 20, the cover member 510 does not interfere with the cutting target material located right below the base 20 no matter how much the cover member 510 is tilted. Therefore, the maximum tilt angle can be increased compared to the conventional plunge-type cutting apparatus. This maximum tilt angle depends on the mechanism that tilts the main body portion 30 and the cover main body 52.

Further, as illustrated in FIG. 22, in the state that the main body portion 30 and the cover 50 are tilted by the maximum tilt angle, the auxiliary cover 500 (more specifically, the first portion 511 of the cover member 510) and the rotational axis AX1 of the saw blade 35 do not overlap each other when being viewed from the direction in which the rotational axis AX1 extends (the left-right direction). This allows the flange 36 holding the saw blade 35 to maximally approach the lower surface 21 of the base 20. Therefore, the circular saw 10 can achieve a great depth to which the saw blade 35 cuts into the cutting target material.

When the main body portion 30 and the cover 50 are returned from the tilted state illustrated in FIG. 22 to the non-tilted state illustrated in FIG. 21, the right-side inner surface of the cover main body 52 presses the abutment portions 514 and 515 of the cover member 510. Therefore, while the first support portion 520*a* and the second support portion 520*b* are slid leftward, the cover member 510 is tilted about the second tilt axis AX7 in the opposite direction, and the auxiliary cover 500 is returned to the position illustrated in FIG. 21 as a whole.

According to the above-described configuration, the abutment portions 514 and 515 and each of the left-side inner surface and the right-side inner surface of the cover main body 52 are constantly in abutment with each other, and therefore the tilt motion of the cover main body 52 about the first tilt axis AX6 and the tilt motion of the cover member 510 about the second tilt axis AX7 can be smoothly interlocked. In addition, a large abutment area can be acquired due to the abutment portions 514 and 515, and therefore the interlocked motion is further smoothed. However, the abutment portions 514 and 515 can be omitted. In this case, the second portion 512 and the third portion 513, and the left-side inner surface of the cover main body 52 may be in abutment with each other in the interlocked motion during the transition from the non-tilted state to the tilted state, and the upper edge portion of the first portion 511 and the right-side inner surface of the cover main body 52 may be in abutment with each other in the interlocked motion during the transition from the tilted state to the non-tilted state. Further, with the main body portion 30 and the cover 50 in the non-tilted state, the abutment portions 514 and 515 (or the second portion 512 and the third portion 513) and the left-side inner surface of the cover main body 52 (the protrusion portion 52*b*) may be out of abutment with each other. Even such a configuration can bring the cover member 510 and the cover main body 52 into abutment with each other at an early stage of the tilt motion due to the second portion 512 and the third portion 513, thereby achieving an advantageous effect to some extent. The abutment portions 514 and 515, and the protrusion portion on the right-side inner surface of the cover main body 52 may also be out of abutment with each other in the non-tilted state similarly.

The second portion 512 and the third portion 513 also have a function of filling the gap between the cover 50 and the base 20 in addition to the above-described functions. More specifically, the cover main body 52 includes two inclined portions 52*a* (refer to FIG. 1) on the right-side portion thereof. The inclined portions 52*a* are inclined so as to approach the left-side portion of the cover main body 52 as extending toward the base 20. The two inclined portions 52*a* are disposed on the both sides of the cover member 510 in the longitudinal direction. The inclined portions 52*a* are formed to avoid interference between the cover main body 52 and the cutting target material when the cover 50 is tilted to the position illustrated in FIG. 22. The second portion 512 and the third portion 513 are disposed adjacent to the two inclined portions 52*a* provided in this manner, and therefore can fill the gap between the cover 50 and the base 20 that can be generated due to the inclined portions 52*a* (FIG. 1 illustrates only a state that the second portion 512 fills the gap).

Further, according to the above-described configuration, the first support portion 520*a* and the second support portion 520*b* are slid during the tilt motion, and therefore the inconsistency between the first tilt axis AX6 and the second tilt axis AX7 is compensated for. Therefore, a further smooth interlocked motion can be achieved between the cover main body 52 and the cover member 510.

In the following description, a circular saw 110 according to a second embodiment will be described with reference to FIGS. 29 to 32. The circular saw 110 according to the second embodiment is different from the circular saw 10 according to the first embodiment in terms of including a lock operation mechanism 180 instead of the lock operation mechanism 80 and including a gear housing 160 instead of the gear housing 60, and is configured similarly to the circular saw 10 except for them. In the following description, the circular saw 110 will be described focusing only on differences from the first embodiment.

Figure 29:
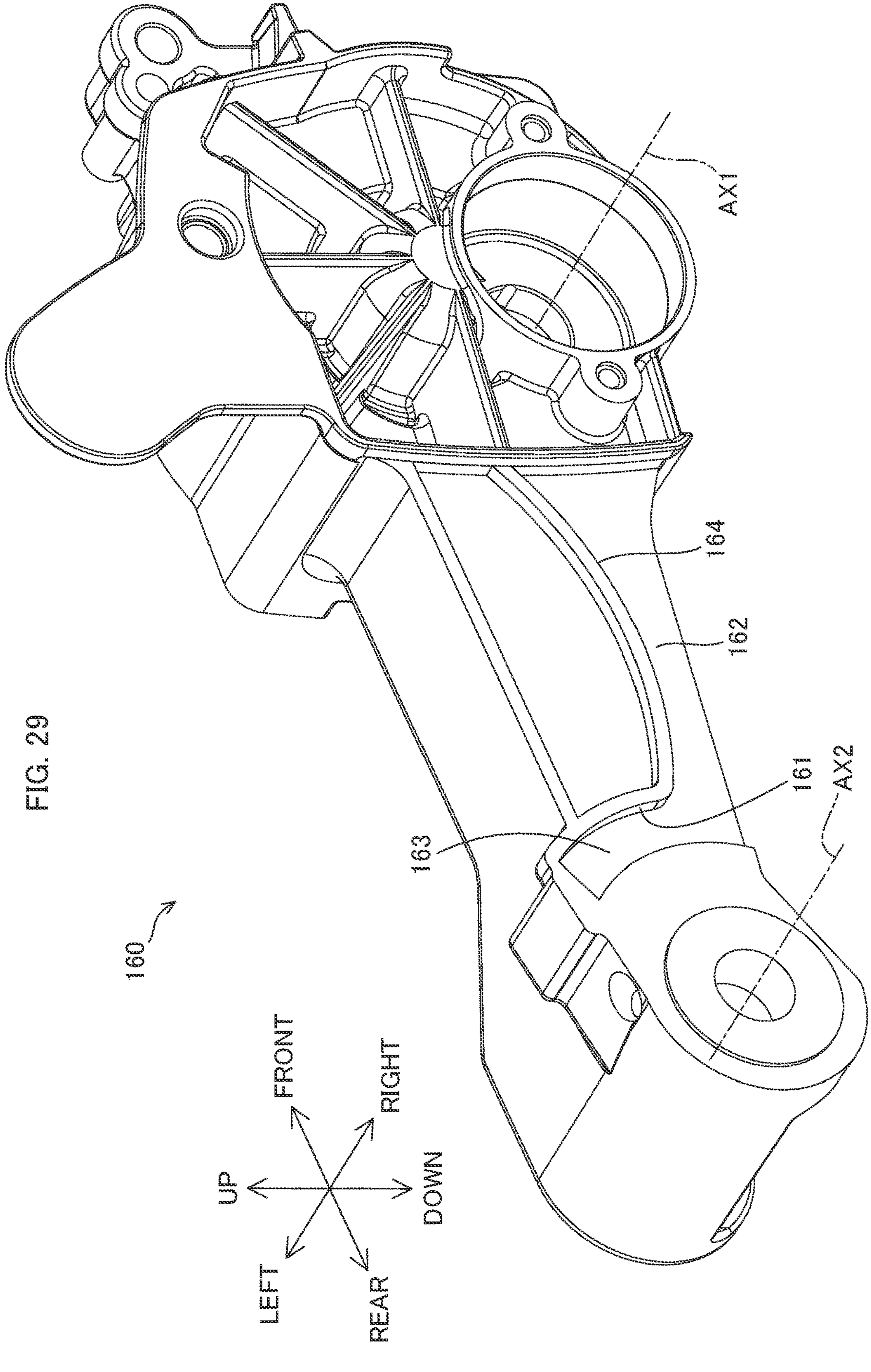
FIG. 29 is a perspective view of a gear housing according to a second embodiment.

As illustrated in FIG. 29, a first abutted portion 161, a retracted portion 162, a recessed portion 163, and a second abutted portion 164 are formed on the right surface of the gear housing 160. The retracted portion 162 and the recessed portion 163 are in the form of a recessed portion that is recessed leftward. The retracted portion 162 and the recessed portion 163 are continuous to each other, and have a generally L-like shape as a whole (more precisely, an L-like shape formed by a circular arc). The first abutted portion 161 is a circular arc-shaped portion adjacent to the recessed portion 163, and forms a side wall of the recessed portion 163 along the recessed portion 163. The second abutted portion 164 is a circular arc-shaped portion adjacent to the retracted portion 162, and forms a side wall of the retracted portion 162 along the retracted portion 162.

The first abutted portion 161, the retracted portion 162, the recessed portion 163, and the second abutted portion 164 are shaped differently from the first abutted portion 61, the retracted portion 62, the recessed portion 63, and the second abutted portion 64 according to the first embodiment, respectively, but are functionally similar to them.

Figure 30:
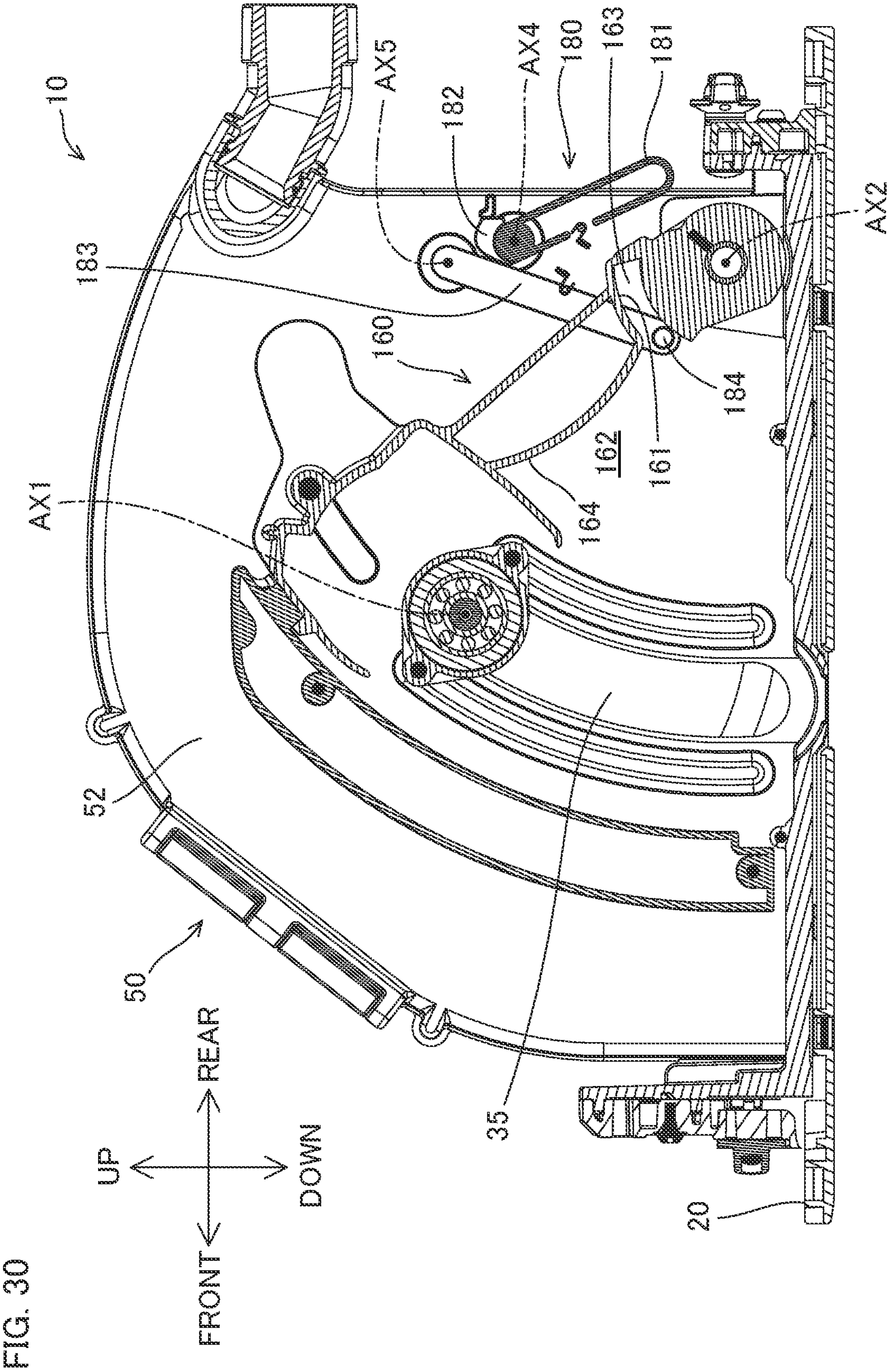
FIG. 30 is a cross-sectional view illustrating the positional relationship between the lock operation mechanism and the gear housing, and the main body portion is located at the top dead center and the lock operation mechanism is located at the blocking position.

As illustrated in FIG. 30, the lock operation mechanism 180 includes an operation lever 181 and a lock lever 183. One end of the operation lever 181 is supported by the cover main body 52 pivotally about a first pivotal axis AX4. The other end of the operation lever 181 is configured as a free end extending rearward. A cam 182 is formed around the proximal end (the above-described one end) of the operation lever 181. One end of the lock lever 183 is supported by the cover main body 52 pivotally about a second pivotal axis AX5. An abutment portion 184, which protrudes leftward (toward the side in which the gear housing 160 is located), is formed at the other end of the operation lever 181.

Figure 31:
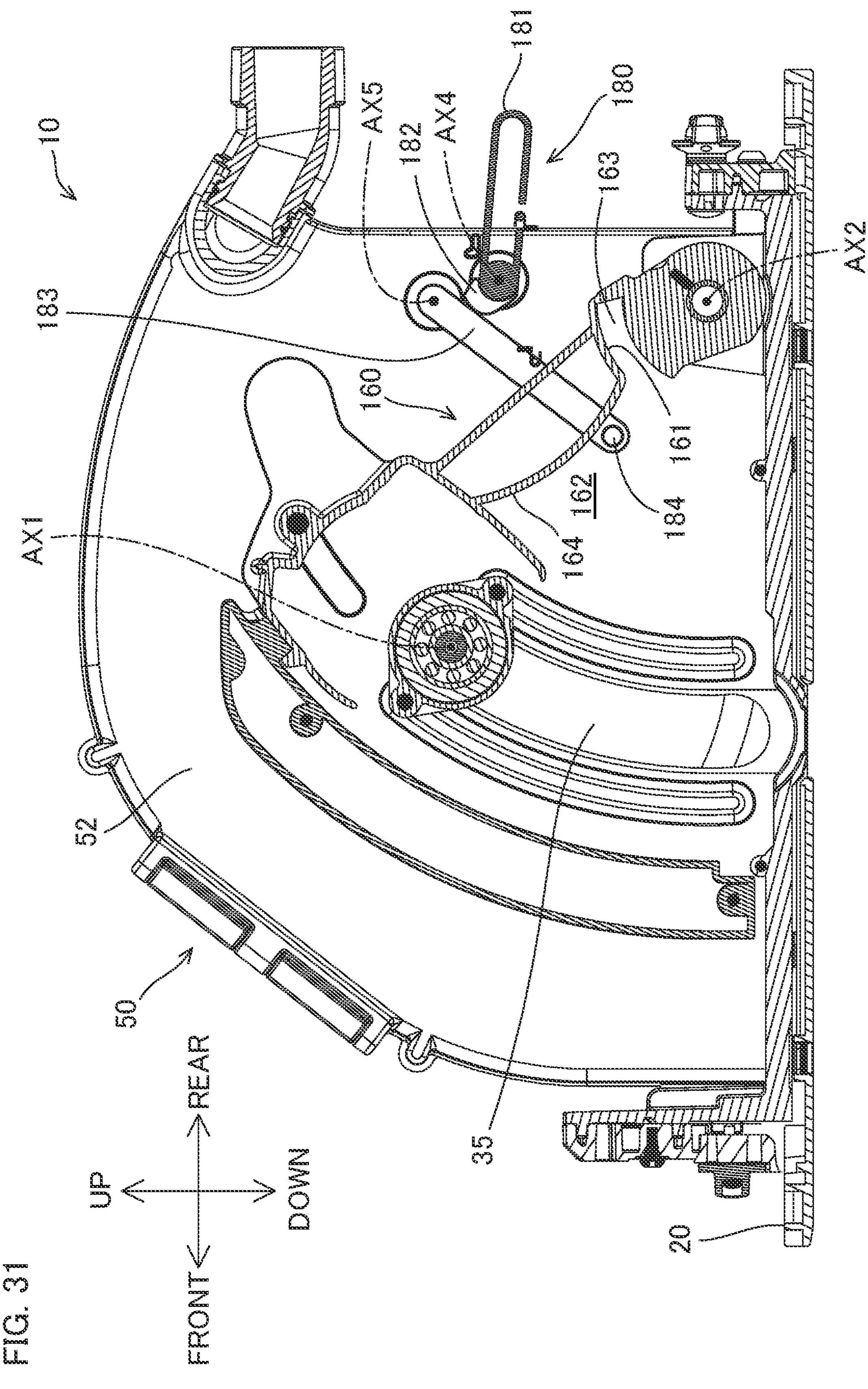
FIG. 31 is a cross-sectional view illustrating the positional relationship between the lock operation mechanism and the gear housing, and the main body portion is located at the top dead center and the lock operation mechanism is located at the permission position.

As illustrated in FIG. 30, when the main body portion 30 is located at the top dead center and the lock operation mechanism 80 is located at the blocking position, the abutment portion 184 is located at a position that faces the proximal end of the retracted portion 162 (a portion thereof connected to the recessed portion 163). In this state, the lock operation mechanism 180 (i.e., the abutment portion 184) is permitted to be displaced from the blocking position to the permission position. More specifically, when the user displaces the operation lever 181 from the blocking position illustrated in FIG. 30 to the permission position illustrated in FIG. 31, the lock lever 183 is pressed by the cam 182 as illustrated in FIG. 31. As a result, the lock lever 183 is pivotally moved in the opposite direction from the direction in which the operation lever 181 is pivotally moved. At this time, the abutment portion 184 is moved from the position that faces the proximal end of the retracted portion 162 to a position that faces a portion of the retracted portion 162 on the distal end side (the end portion thereof on the opposite side from the portion connected to the recessed portion 163) as illustrated in FIG. 31. When the user returns the operation lever 181 from the permission position to the blocking position, the pressing force exerted by the cam 182 is released and the lock lever 183 is returned to the original position due to its own weight.

In the state illustrated in FIG. 31, i.e., when the main body portion 30 is located at the top dead center and the lock operation mechanism 180 is located at the permission position, even with the user trying to displace the main body portion 30 toward the bottom dead center, the second abutted portion 164 is in abutment with the abutment portion 184 in a direction for blocking this displacement. As a result, the user cannot displace the main body portion 30 toward the bottom dead center.

Figure 32:
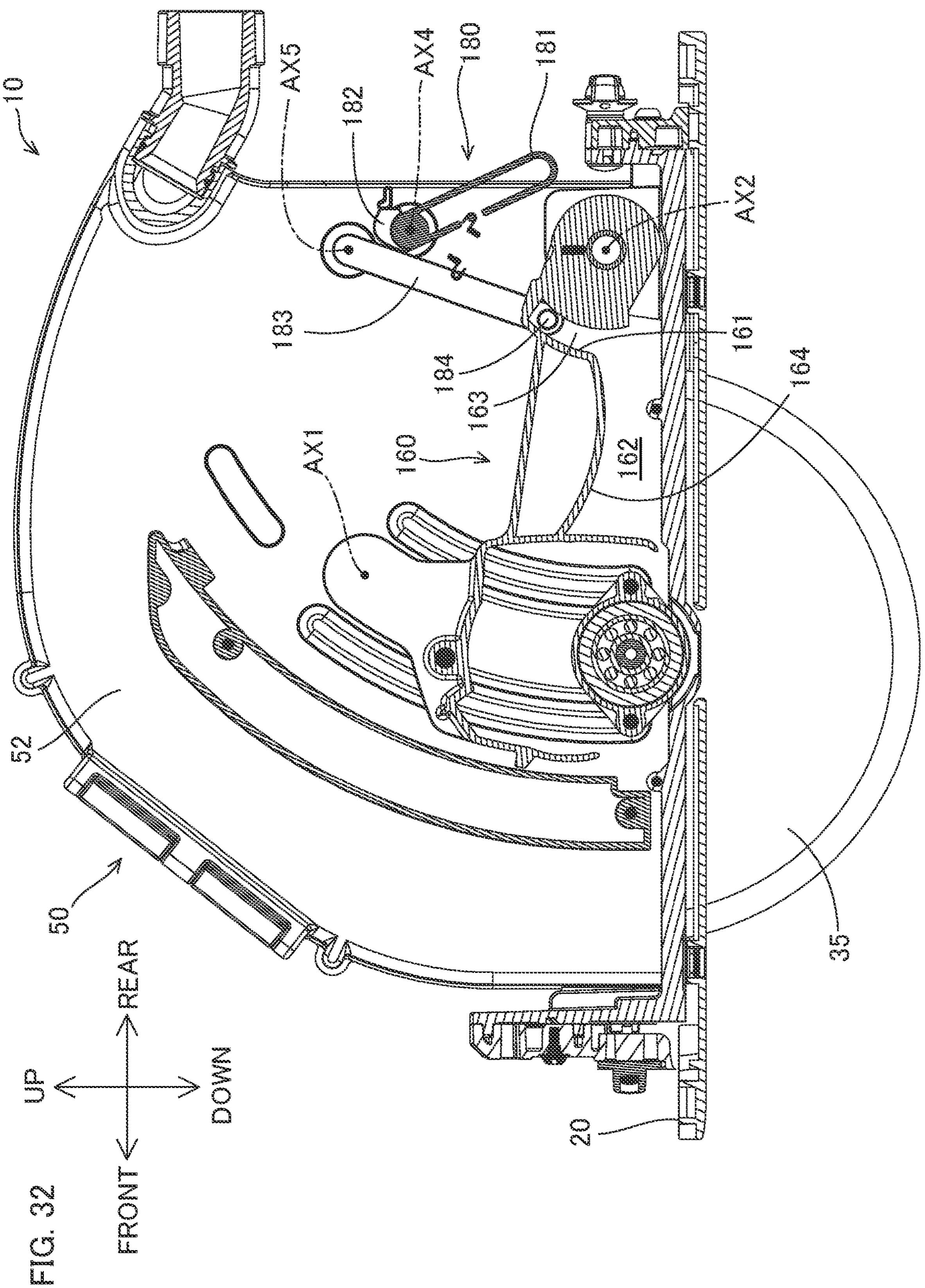
FIG. 32 is a cross-sectional view illustrating the positional relationship between the lock operation mechanism and the gear housing, and the main body portion is located at the bottom dead center and the lock operation mechanism is located at the blocking position.

On the other hand, in the state illustrated in FIG. 30, i.e., when the main body portion 30 is located at the top dead center and the lock operation mechanism 180 is located at the blocking position, the user's displacing the main body portion 30 to the bottom dead center causes the abutment portion 184 to be moved to the position that faces the distal end of the recessed portion 163 (the end portion thereof on the opposite side from the portion connected to the retracted portion 162) in the recessed portion 163 as illustrated in FIG. 32. As a result, the main body portion 30 is permitted to be displaced from the top dead center toward the bottom dead center.

In the state illustrated in FIG. 32, i.e., when the main body portion 30 is located at a position other than the top dead center and the lock operation mechanism 80 is located at the blocking position, even with the user trying to displace the lock operation mechanism 180 from the blocking position toward the permission position, the abutment portion 184 is in abutment with the first abutted portion 161 in a direction for blocking this displacement. As a result, the user cannot displace the lock operation mechanism 180 toward the permission position.

In this manner, functions similar to the lock operation mechanism 80 and the gear housing 60 according to the first embodiment can also be achieved by using the lock operation mechanism 180 and the gear housing 160. Further, the design flexibility of the lock operation mechanism is increased and the operability can be improved by configuring the lock operation mechanism 180 to include two pivotal axes.

Having described the embodiments of the present invention, the above-described embodiments are intended to only facilitate the understanding of the present invention, and are not intended to limit the present invention thereto. The present invention can be modified or improved without departing from the spirit thereof, and the present invention includes equivalents thereof. Further, each of the elements described in the claims and the specification can be combined in any manner or omitted in any manner within a range that allows them to remain capable of achieving at least a part of the above-described objects or bringing about at least a part of the above-described advantageous effects.

For example, the lock operation mechanism 80 or 180 may be supported by the gear housing 60 or 160 instead of the cover main body 52. In this case, configurations corresponding to the first abutted portion 61 or 161, the retracted portion 62 or 162, the recessed portion 63 or 163, and the second abutted portion 64 or 164 may be included in the cover main body 52.

Alternatively, a configuration in which the main body portion 30 is vertically translated may be employed instead of the configuration in which the main body portion 30 pivots about the pivotal axis AX2. In this case, the shapes of the first abutted portion 61 or 161, the retracted portion 62 or 162, the recessed portion 63 or 163, and the second abutted portion 64 or 164 can be set appropriately according to the direction in which the main body portion 30 is displaced.

Alternatively, a configuration in which the engagement member 94 is engaged with the output shaft 42 to block the rotation of the output shaft 42 when the battery 45 is dismounted from the battery mount portion 46 may be employed instead of the above-described configuration in which the engagement member 94 is engaged with the motor shaft 34 to block the rotation of the motor shaft 34 when the battery 45 is dismounted from the battery amount portion 46. In this case, any mechanical mechanism that transmits the displacement of the operation member 90 to the engagement member 94 can be employed.

Alternatively, the configurations not relating to the battery 45, among the above-described various configurations, are also applicable to a type of circular saw that uses a commercial power source as the power source of the electric motor 33.

Alternatively, the above-described various interlocked motions between the plurality of members may be realized by not only the above-described configurations but also any mechanical configuration capable of fulfilling similar functions.

Further, the above-described various embodiments are applicable to not only the circular saw but also any plunge-type portable machining apparatus (for example, a groove cutter).

The corresponding relationship between each component in the above-described embodiments and each component of the present invention will be described below. However, each component in the embodiments is merely one example and shall not limit each component of the present invention. The circular saw 10 is one example of a "portable machining apparatus". The saw blade 35 is one example of a "tip tool". The cover 50 is one example of a "cover". The cover main body 52 is one example of a "cover main body". The door 53 is one example of a "door". The open/close mechanism 70 is one example of an "open/close mechanism". The lock operation mechanism 80 is one example of a "lock operation mechanism". The top dead center is one example of a "first position". The bottom dead center is one example of a "second position". The abutment portions 85 and 184 are one example of an "abutment portion". The first abutted portions 61 and 161 are one example of a "first abutted portion". The retracted portions 62 and 162 are one example of a "retracted portion". The recessed portions 63 and 163 are one example of a "recessed portion". The second abutted portions 64 and 164 are one example of a "second abutted portion". The hinge mechanism 54 is one example of a "hinge mechanism". The rotational axis AX1 is one example of a "rotational axis". The pivotal axis AX2 is one example of a "pivotal axis". The first pivotal axis AX4 is one example of a "first pivotal axis". The second pivotal axis AX5 is one example of a "second pivotal axis". The engagement portion 71 is one example of an "engagement portion". The compression spring 75 is one example of a "biasing member". The lock member 76 is one example of a "lock member". The battery 45 is one example of a "battery". The battery mount portion 46 is one example of a "battery mount portion". The operation portion 81 and the operation lever 181 are one example of an "operation lever". The lock lever 183 is one example of a "lock lever". The engagement member 94 is one example of an "engagement member". The operation member 90 is one example of an "operation member".

DESCRIPTION OF THE REFERENCE NUMERALS

10, 110 circular saw
20 base
21 lower surface
22 support shaft
23 torsion spring
24, 25 angular plate
26 angular
27 trunnion
28, 29 finger screw
30 main body portion
31 motor housing
32 grip portion
33 electric motor
34 motor shaft
35 saw blade
36 flange
37 through-hole
38 trigger
39 lock pin
40 release button
41 stopper
42 output shaft
43 reduction gear
45 battery
46 battery mount portion
47 terminal
50 cover
51 recessed portion
52 cover main body
**52*a*** inclined portion
53 door
54 hinge mechanism
55 engagement portion
56 through-hole
57 protrusion
58 angle switching knob
60, 160 gear housing
61, 161 first abutted portion
67, 162 retracted portion
63, 163 recessed portion
64, 164 second abutted portion
70 open/close mechanism
71 engagement portion
72 first engagement piece
73 second engagement piece
74 screw
75 compression spring
76 lock member
77 engagement portion
78 pressed portion
79 step
80, 180 lock operation mechanism
81 operation portion
82 base portion
83 coupling portion
84 arm portion
85 abutment portion
90 operation member
91 knob
92 shaft
93 pressing portion
94 engagement member
95 annular portion
96 engagement portion
97 pressed portion
98 compression spring
99 pin
181 operation lever
182 cam
183 lock lever
184 abutment portion
500 auxiliary cover
510 cover member
511 first portion
512 second portion
513 third portion
514, 515 abutment portion
516 rib
520 support member
**520*a*** first support portion
**520*b*** second support portion
**530*a*, 530*b*** hinge mechanism
AX1 rotational axis
AX2 pivotal axis
AX3 pivotal axis AX4 first pivotal axis
AX5 second pivotal axis
AX6 first tilt axis
AX7 second tilt axis

What is claimed is:

1. A portable machining apparatus comprising:
a main body portion including a motor, the motor being configured to provide a rotational driving force to a tip tool;
a cover configured to at least partially cover the tip tool, and including a cover main body and an openable/closable door;
a latch that is supported by the cover main body and is displaceable between a close position, at which the latch holds the door in a closed state by being engaged with an engagement portion of the door, and an open position, at which the latch brings the door into an openable state without being engaged with the door; and
an actuator that is displaceably supported by one of the cover main body and the main body portion, and is displaceable according to a manual operation between a blocking position, at which the actuator blocks the door from being opened by the latch, and a permission position, at which the actuator permits the door to be opened by the latch,
wherein the main body portion is configured to be displaceable relative to the cover between a first position, at which the tip tool is entirely contained in the cover, and a second position, at which the tip tool is partially exposed to outside the cover,
the portable machining apparatus is configured in such a manner that a manual operation for displacing the actuator from the blocking position to the permission position is permitted when the main body portion is located at the first position, and that the manual operation for displacing the actuator from the blocking position to the permission position is prohibited by abutment between the other of the cover main body and the main body portion and the actuator when the main body portion is located at a position other than the first position,
the actuator includes an abutment portion protruding toward the other of the cover main body and the main body portion, and configured to be displaceable between the blocking position and the permission position,
the other of the cover main body and the main body portion includes
a first abutted portion configured to be in abutment with the abutment portion in a direction for prohibiting the abutment portion from being displaced from the blocking position to the permission position when the main body portion is located at the position other than the first position, and
a retracted portion disposed adjacent to the first abutted portion, and recessed with respect to the first abutted portion in a direction in which the abutment portion protrudes, the retracted portion, and
the abutment portion is located at a position that faces the retracted portion and is out of abutment with the first abutted portion in the direction for prohibiting the abutment portion from being displaced from the blocking position to the permission position when the main body portion is located at the first position.

2. The portable machining apparatus according to claim 1, wherein the actuator is supported by the cover main body.

3. The portable machining apparatus according to claim 1, wherein the main body portion is configured to be pivotal about a pivotal axis relative to the cover between the first position and the second position, and
the abutment portion and the first abutted portion are disposed at positions closer to the pivotal axis than to the rotational axis of the tip tool.

4. The portable machining apparatus according to claim 3, wherein the first abutted portion is formed in a circular arc shape,
the other of the cover main body and the main body portion includes a recessed portion recessed with respect to the first abutted portion, and formed along the first abutted portion adjacent to the first abutted portion, and
the main body portion and the abutment portion are moved relative to each other while the abutment portion faces the recessed portion when the main body portion is displaced between the first position and the second position in a state that the abutment portion is located at the blocking position.

5. The portable machining apparatus according to claim 4, wherein the other of the cover main body and the main body portion includes a second abutted portion formed along the retracted portion, and configured to be in abutment with the abutment portion in a direction for prohibiting the main body portion from being displaced from the first position toward the second position when the abutment portion is located at the permission position.

6. The portable machining apparatus according to claim 3, wherein the other of the cover main body and the main body portion includes a second abutted portion formed along the retracted portion, and configured to be in abutment with the abutment portion in a direction for prohibiting the main body portion from being displaced from the first position toward the second position when the abutment portion is located at the permission position.

7. The portable machining apparatus according to claim 1, wherein the other of the cover main body and the main body portion includes a second abutted portion formed along the retracted portion, and configured to be in abutment with the abutment portion in a direction for prohibiting the main body portion from being displaced from the first position toward the second position when the abutment portion is located at the permission position.

8. A portable machining apparatus comprising:
a main body portion including a motor, the motor being configured to provide a rotational driving force to a tip tool;
a cover configured to at least partially cover the tip tool, and including a cover main body and an openable/closable door;
a latch that is supported by the cover main body and is displaceable between a close position, at which the latch holds the door in a closed state by being engaged with an engagement portion of the door, and an open position, at which the latch brings the door into an openable state without being engaged with the door; and
an actuator that is displaceably supported by one of the cover main body and the main body portion, and is displaceable according to a manual operation between a blocking position, at which the actuator blocks the door from being opened by the latch, and a permission position, at which the actuator permits the door to be opened by the latch, wherein the main body portion is configured to be displaceable relative to the cover between a first position, at which the tip tool is fully contained in the cover, and a second position, at which the tip tool is partially exposed to outside the cover, and the portable machining apparatus is configured in such a manner that:

a manual operation for displacing the actuator from the blocking position to the permission position is permitted when the main body portion is located at the first position;

the manual operation for displacing the actuator from the blocking position to the permission position is prohibited by abutment between the other of the cover main body and the main body portion and the actuator when the main body portion is located at a position other than the first position; and a manual operation for displacing the main body portion from the first position toward the second position is permitted when the actuator is located at the blocking position;

the manual operation for displacing the main body portion from the first position toward the second position is prohibited by abutment between the other of the cover main body and the main body portion and the actuator when the actuator is located at the permission position, the actuator includes an abutment portion protruding toward the other of the cover main body and the main body portion, and configured to be displaceable between the blocking position and the permission position, the other of the cover main body and the main body portion includes a first abutted portion configured to be in abutment with the abutment portion in a direction for prohibiting the abutment portion from being displaced from the blocking position to the permission position when the main body portion is located at the position other than the first position, and a retracted portion disposed adjacent to the first abutted portion, and recessed with respect to the first abutted portion in a direction in which the abutment portion protrudes, the retracted portion, and the abutment portion is located at a position that faces the retracted portion and is out of abutment with the first abutted portion in the direction for prohibiting the abutment portion from being displaced from the blocking position to the permission position when the main body portion is located at the first position.

* * * * *